(12) United States Patent
Takahashi et al.

(10) Patent No.: US 12,115,872 B2
(45) Date of Patent: Oct. 15, 2024

(54) CONTACTLESS POWER SUPPLY SYSTEM AND CONTACTLESS POWER SUPPLY APPARATUS

(71) Applicant: DENSO CORPORATION, Kariya (JP)

(72) Inventors: Eisuke Takahashi, Kariya (JP); Nobuhisa Yamaguchi, Kariya (JP); Koji Mazaki, Kariya (JP); Shimpei Takita, Kariya (JP); Hayato Sumiya, Kariya (JP); Masaki Kanesaki, Kariya (JP); Takuya Kiguchi, Kariya (JP); Kazuhiro Uda, Kariya (JP); Mitsuru Shibanuma, Kariya (JP); Kazuyoshi Obayashi, Kariya (JP); Tomoyuki Fujikawa, Kariya (JP); Masaya Takahashi, Kariya (JP); Yusei Nakayashiki, Kariya (JP)

(73) Assignee: DENSO CORPORATION, Kariya (JP)

( * ) Notice: Subject to any disclaimer, the term of this patent is extended or adjusted under 35 U.S.C. 154(b) by 961 days.

(21) Appl. No.: 17/134,636

(22) Filed: Dec. 28, 2020

(65) Prior Publication Data

US 2021/0114465 A1    Apr. 22, 2021

Related U.S. Application Data

(63) Continuation of application No. PCT/JP2019/017046, filed on Apr. 22, 2019.

(30) Foreign Application Priority Data

Jun. 26, 2018 (JP) .................................. 2018-120335
Feb. 28, 2019 (JP) .................................. 2019-035163

(51) Int. Cl.
*B60L 53/12* (2019.01)
*B60L 9/00* (2019.01)
(Continued)

(52) U.S. Cl.
CPC ................ *B60L 53/122* (2019.02); *B60L 9/00* (2013.01); *B60L 53/12* (2019.02); *B60L 53/39* (2019.02);
(Continued)

(58) Field of Classification Search
CPC .......... B60L 9/00; B60L 53/122; B60L 53/39; B60L 53/12; Y02T 10/70; Y02T 10/7072;
(Continued)

(56) References Cited

U.S. PATENT DOCUMENTS 11,370,305 B2 * 6/2022 Hosek ..................... B60M 7/003
2012/0217111 A1 * 8/2012 Boys ....................... H01F 38/14
191/10

(Continued)

FOREIGN PATENT DOCUMENTS

EP        3 386 069 A1    10/2018
JP        H05-316659 A    11/1993
(Continued)

OTHER PUBLICATIONS

Jun. 18, 2019 International Search Report issued in Internaitonal Patent Application No. PCT/JP2019/017046.

*Primary Examiner* — Zachary L Kuhfuss
(74) *Attorney, Agent, or Firm* — Oliff PLC

(57) ABSTRACT

A contactless power supply system is provided for supplying electric power to a vehicle in a contactless manner during traveling of the vehicle. The contactless power supply system includes a plurality of primary coils installed along a traveling direction in a road and a secondary coil mounted to the vehicle. Each of the primary coils is a single-phase coil with the secondary coil being a multi-phase coil, or is a multi-phase coil with the secondary coil being a single-phase coil.

14 Claims, 22 Drawing Sheets

(51) Int. Cl.
  *B60L 53/122* (2019.01)
  *B60L 53/39* (2019.01)
  *H01F 38/14* (2006.01)
  *H02J 50/12* (2016.01)
  *H02J 50/40* (2016.01)

(52) U.S. Cl.
  CPC .............. *H01F 38/14* (2013.01); *H02J 50/12* (2016.02); *H02J 50/402* (2020.01)

(58) Field of Classification Search
  CPC ......... Y02T 90/12; Y02T 90/14; H02J 50/12; H02J 50/402; H02J 50/70; H02J 50/90; H02J 2310/48; H01F 27/366; H01F 38/14
  See application file for complete search history.

(56) References Cited

U.S. PATENT DOCUMENTS

| | | |
|---|---|---|
| 2013/0285463 A1 | 10/2013 | Covic et al. |
| 2015/0061585 A1 | 3/2015 | Obayashi et al. |
| 2015/0084406 A1 | 3/2015 | Czainski et al. |
| 2015/0123486 A1 | 5/2015 | Abe et al. |
| 2015/0207335 A1 | 7/2015 | Madawala et al. |
| 2015/0298559 A1 | 10/2015 | Keeling et al. |
| 2017/0222485 A1 | 8/2017 | Covic et al. |
| 2017/0222490 A1 | 8/2017 | Boys et al. |
| 2018/0277294 A1* | 9/2018 | Takikawa ................ H01F 38/14 |

FOREIGN PATENT DOCUMENTS

| | | |
|---|---|---|
| JP | 2006-335289 A | 12/2006 |
| JP | 2010-172084 A | 8/2010 |
| JP | 2015-211538 A | 11/2015 |

* cited by examiner

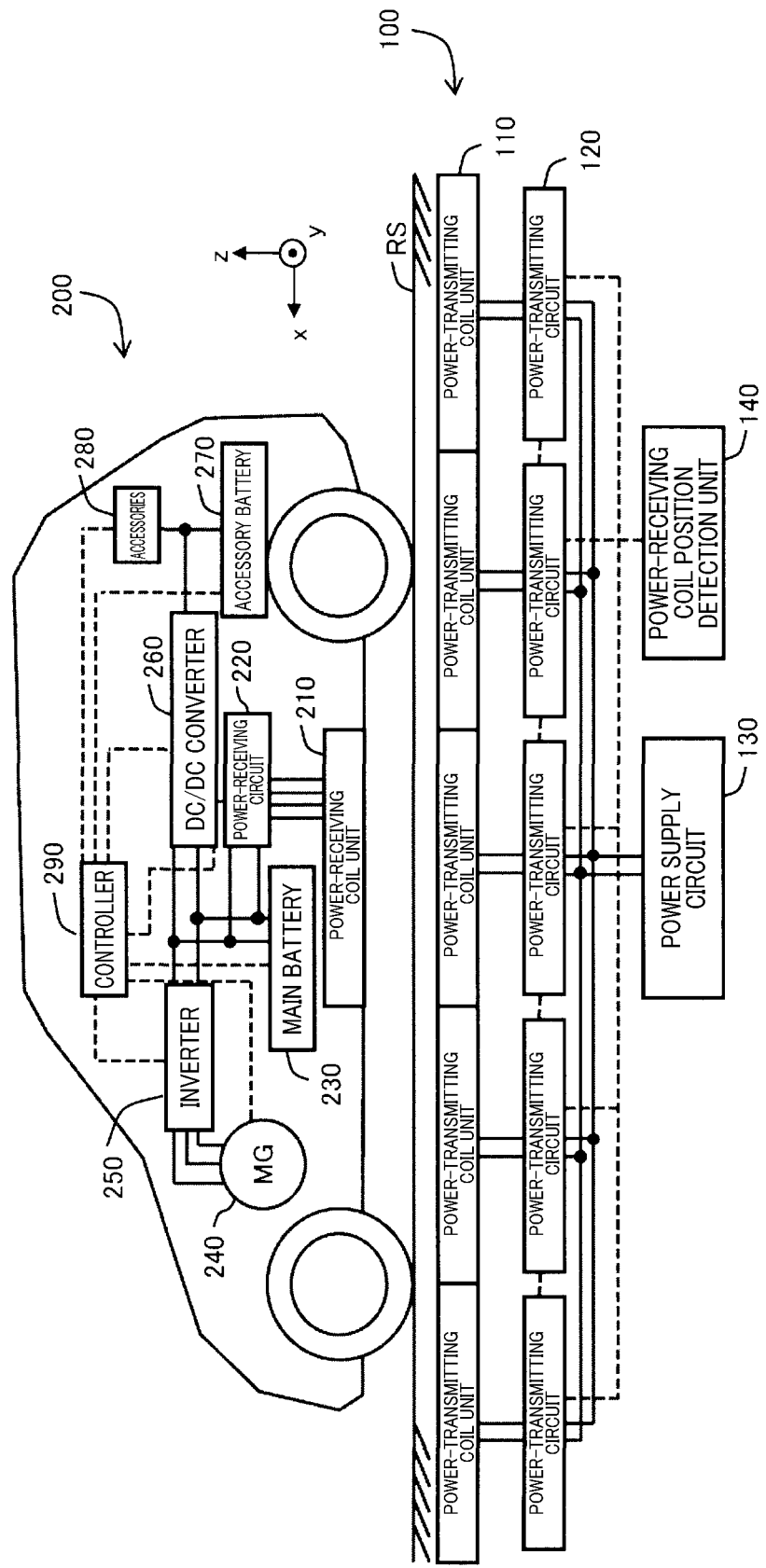

FIG.5
| COIL CONFIGURATION No. | | #1 | #2 | #3 | #4 |
|---|---|---|---|---|---|
| NUMBER OF PHASES OF COIL | PRIMARY COIL | SINGLE-PHASE | MULTI-PHASE | SINGLE-PHASE | MULTI-PHASE |
| | SECONDARY COIL | SINGLE-PHASE | SINGLE-PHASE | MULTI-PHASE | MULTI-PHASE |
| COIL EFFICIENCY | | △ | ○ | ○ | ○ |
| ELECTRIC POWER PULSATION | | × | ○ | ○ | ○ |
| DISPLACEMENT ROBUSTNESS | | × | ○ | ○ | ○ |
| INFRASTRUCTURE COST | | ○ | △ | ○ | × |
○ : EXCELLENT
△ : GOOD
× : BAD
FIG.6A
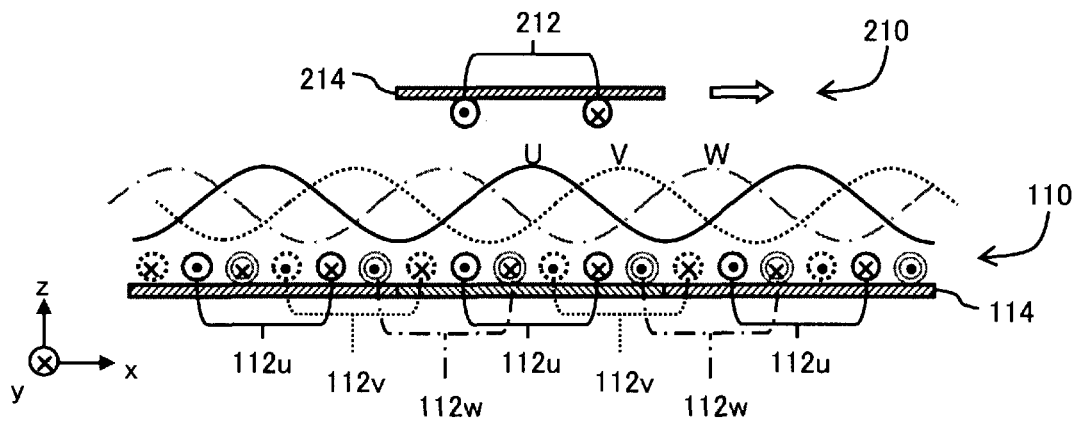
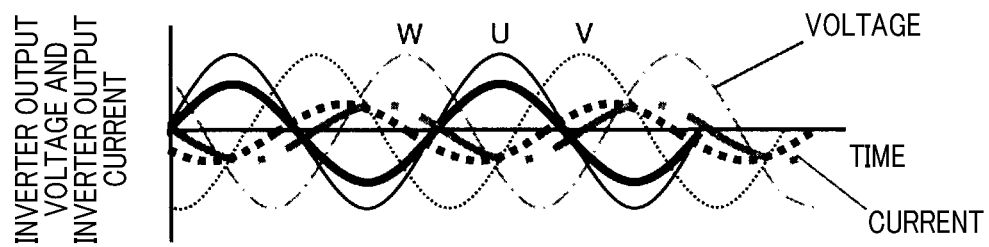

MECHANICAL PHASE OF TWO-PHASE SECONDARY COIL
(EXPRESSED IN ELECTRICAL ANGLE (°))

MECHANICAL PHASE OF TWO-PHASE SECONDARY COIL
(EXPRESSED IN ELECTRICAL ANGLE (°))

CONTACTLESS POWER SUPPLY SYSTEM AND CONTACTLESS POWER SUPPLY APPARATUS

CROSS-REFERENCE TO RELATED APPLICATIONS

The present application is a continuation application of International Application No. PCT/JP2019/017046 filed on Apr. 22, 2019, which is based on and claims priority from Japanese Patent Application No. 2018-120335 filed on Jun. 26, 2018 and Japanese Patent Application No. 2019-035163 filed on Feb. 28, 2019. The contents of these applications are hereby incorporated by reference in their entirety into the present application.

BACKGROUND

1 Technical Field

The present disclosure relates to systems and apparatuses for supplying electric power to a vehicle in a contactless manner during traveling of the vehicle.

2 Description of Related Art

There is known a technique of supplying electric power to a vehicle in a contactless (or wireless) manner during traveling of the vehicle. According to the known technique, a plurality of primary coils are installed in a road and a secondary coil is mounted to the vehicle. Moreover, each of the primary coils and the secondary coil is configured as a three-phase coil.

SUMMARY

According to the present disclosure, there is provided a contactless power supply system for supplying electric power to a vehicle in a contactless manner during traveling of the vehicle. The contactless power supply system includes a plurality of primary coils installed along a traveling direction in a road and a secondary coil mounted to the vehicle. Each of the primary coils is a single-phase coil with the secondary coil being a multi-phase coil, or is a multi-phase coil with the secondary coil being a single-phase coil.

BRIEF DESCRIPTION OF THE DRAWINGS

FIG. 1 is a block diagram illustrating the overall configuration of a contactless power supply system according to an embodiment, the contactless power supply system being configured to supply electric power to a vehicle in a contactless manner during traveling of the vehicle.

FIG. 5 is an explanatory diagram showing evaluation results of four coil configurations.

FIG. 6A is an explanatory diagram showing inverter outputs when each of primary coils is a multi-phase coil and a secondary coil is a single-phase coil.

DESCRIPTION OF EMBODIMENTS

Figure 2A:
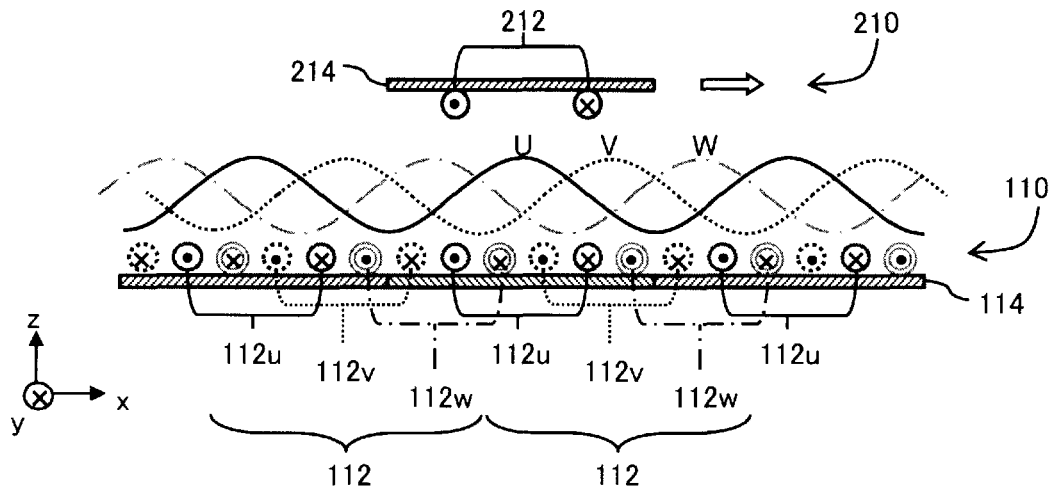
FIG. 2A is an explanatory diagram illustrating a coil configuration where each of primary coils is a three-phase coil and a secondary coil is a single-phase coil.

According to the above-described technique known in the art (see, for example, Japanese Patent Application Publication No. JP 2015-521456 A), each of the primary coils and the secondary coil is configured as a three-phase coil. Consequently, pulsation of the electric power supplied to the vehicle during traveling of the vehicle is small. However, the size of a contactless power supply system configured according to the known technique may become large, increasing the manufacturing cost.

In contrast, in the above-described contactless power supply system according to the present disclosure, each of the primary coils is a single-phase coil with the secondary coil being a multi-phase coil, or is a multi-phase coil with the secondary coil being a single-phase coil. Consequently, it becomes possible to simplify the configuration of the contactless power supply system while suppressing pulsation of the electric power supplied to the vehicle during traveling of the vehicle. In other words, it becomes possible for the contactless power supply system to supply, with a simple configuration, the vehicle with electric power whose pulsation is small.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

FIG. 1 shows the overall configuration of a contactless (or wireless) power supply system according to an embodiment. The contactless power supply system includes a contactless power supply apparatus 100 installed in a road RS and a vehicle 200 traveling on the road RS. The contactless power supply system is a system capable of supplying electric power from the contactless power supply apparatus 100 to the vehicle 200 during traveling of the vehicle 200. The vehicle 200 is configured as, for example, an electric vehicle or a hybrid vehicle.

In the following explanation and the drawings, an "x direction" represents the traveling direction (or longitudinal direction) of the vehicle 200; a "y direction" represents the width direction (or lateral direction) of the vehicle 200; and a "z direction" represents the vertical direction. The x direction, the y direction and the z direction are perpendicular to each other.

The contactless power supply apparatus 100 includes a plurality of power-transmitting coil units 110, a plurality of power-transmitting circuits 120 for respectively supplying an AC voltage to the power-transmitting coil units 110, a power supply circuit 130 for supplying a DC voltage to the power-transmitting circuits 120, and a power-receiving coil position detection unit 140.

The power-transmitting coil units 110 are installed along the traveling direction in the road RS. Each of the power-transmitting coil units 110 includes a primary coil which will also be referred to as a "power-transmitting coil" hereinafter. The configuration examples of the power-transmitting coil units 110 will be described in detail later.

In addition, the primary coils are not necessarily included in the respective power-transmitting coil units 110; it is only necessary for the contactless power supply apparatus 100 to have a plurality of primary coils installed along the traveling direction in the road RS.

Each of the power-transmitting circuits 120 is an inverter circuit that converts the DC voltage supplied from the power supply circuit 130 into a high-frequency AC voltage and applies the high-frequency AC voltage to the primary coil of a corresponding one of the power-transmitting coil units 110.

The power supply circuit 130 is a circuit that supplies the DC voltage to the power-transmitting circuits 120. Specifically, the power supply circuit 130 is configured as, for example, an AC-to-DC converter circuit that converts (or rectifies) an AC voltage outputted from an external AC power source into a DC voltage and outputs the resultant DC voltage to the power-transmitting circuits 120. In addition, the DC voltage outputted from the power supply circuit 130 may not be a perfect DC voltage; that is, the DC voltage may include ripple to a certain extent.

The power-receiving coil position detection unit 140 is configured to detect the position of a power-receiving coil unit 210 mounted to the vehicle 200. For example, the power-receiving coil position detection unit 140 may detect the position of the power-receiving coil unit 210 on the basis of the magnitude of the transmitted electric power or transmitted electric current in the power-transmitting circuits 120. Alternatively, the power-receiving coil position detection unit 140 may detect the position of the power-receiving coil unit 210 via wireless communication with the vehicle 200 or using a position sensor (not shown) that detects the position of the vehicle 200.

Based on the position of the power-receiving coil unit 210 detected by the power-receiving coil position detection unit 140, the power-transmitting circuits 120 perform electric power transmission using at least one of the power-transmitting coil units 110 located in close vicinity to the power-receiving coil unit 210.

The vehicle 200 includes the aforementioned power-receiving coil unit 210, a power-receiving circuit 220, a main battery 230, a motor-generator (abbreviated to MG in FIG. 1) 240, an inverter circuit 250, a DC-to-DC converter circuit 260, an accessory battery 270, accessories 280 and a controller 290.

The power-receiving coil unit 210 includes a secondary coil. The power-receiving coil unit 210 is a device that generates an induced electromotive force by electromagnetic induction between the secondary coil and the primary coils of the power-transmitting coil units 110. In addition, the secondary coil will also be referred to as a "power-receiving coil" hereinafter.

The power-receiving circuit 220 is a circuit that converts an AC voltage outputted from the power-receiving coil unit 210 into a DC voltage suitable for charging the main battery 230. Specifically, the power-receiving circuit 220 is configured as, for example, a circuit that includes both a rectifier circuit for rectifying the AC voltage into a DC voltage and a DC-to-DC converter circuit for boosting the DC voltage. The DC voltage outputted from the power-receiving circuit 220 can be used for charging the main battery 230, for charging the accessory battery 270, for driving the motor-generator 240 and for driving the accessories 280.

The main battery 230 is a secondary battery that outputs a relatively high DC voltage for driving the motor-generator 240.

The motor-generator 240 functions as a three-phase AC motor to generate a driving force (or torque) for driving the vehicle 200 to travel. Otherwise, during deceleration of the vehicle 200, the motor-generator 240 functions as an electric generator to generate a three-phase AC voltage.

When the motor-generator 240 functions as a three-phase AC motor, the inverter circuit 250 converts the DC voltage outputted from the main battery 230 into a three-phase AC voltage and supplies the three-phase AC voltage to the motor-generator 240. Otherwise, when the motor-generator 240 functions as an electric generator, the inverter circuit 250 converts (or rectifies) the three-phase AC voltage outputted from the motor-generator 240 into a DC voltage and supplies the DC voltage to the main battery 230.

The DC-to-DC converter circuit 260 converts the DC voltage outputted from the main battery 230 into a lower DC voltage and supplies the lower DC voltage to the accessory battery 270 and the accessories 280.

The accessory battery 270 is a secondary battery that outputs a relatively low DC voltage for driving the accessories 280.

The accessories 280 are peripheral devices which include, for example, an air conditioner and an electric power steering device.

The controller 290 controls the above-described components of the vehicle 200. For example, during the contactless power supply from the contactless power supply apparatus 100 to the vehicle 200, the controller 290 controls the power-receiving circuit 220 to receive the electric power supplied from the contactless power supply apparatus 100.

As shown in FIG. 2A, each of the power-transmitting coil units 110 includes a primary coil 112 as mentioned above and a magnetic yoke 114. On the other hand, the power-receiving coil unit 210 includes a secondary coil 212 as mentioned above and a magnetic yoke 214.

In the configuration example shown in FIG. 2A, the primary coil 112 is configured as a three-phase coil that consists of a U-phase coil 112$u$, a V-phase coil 112$v$ and a W-phase coil 112$w$. The three phase coils 112$u$, 112$v$ and 112$w$ are either star-connected or Δ-connected together. In contrast, the secondary coil 212 is configured as a single-phase coil. Moreover, each of the coils 112$u$, 112$v$, 112$w$ and 212 is configured as a concentratedly-wound coil having two or more turns; however, for the sake of simplicity, these coils are only schematically shown in FIG. 2A. In addition, in FIG. 2A, the symbols "·" and "×" placed within circles representing wires of the coils respectively indicate opposite directions of electric current; the same also applies to other figures to be described later.

The magnetic yokes 114 and 214 are so-called back yokes; they are used for increasing magnetic flux density around the coils 112 and 212. The magnetic yokes 114 of the power-transmitting coil units 110 are arranged on the back side of the primary coils 112. Here, "the back side of the primary coils 112" denotes the opposite side of the primary coils 112 to the gap between the primary coils 112 and the secondary coil 212. Similarly, the magnetic yoke 214 of the power-receiving coil unit 210 is arranged on the back side of the secondary coil 212. It should be noted that apart from the magnetic yokes 114 and 214, magnetic cores may be provided in the primary coils 112 and the secondary coil 212. Moreover, it also should be noted that shield plates made of a nonmagnetic metal may be provided respectively on the back side of the magnetic yokes 114 and on the back side of the magnetic yoke 214.

In FIG. 2A, there are depicted the waveforms of U-phase, V-phase and W-phase voltages applied respectively to the U-phase, V-phase and W-phase coils 112$u$, 112$v$ and 112$w$ of each of the primary coils 112. The frequency of the AC voltages applied to the primary coils 112 is set to a sufficiently high frequency such that with regard to the electric power transmission from the primary coils 112 to the secondary coil 212, the secondary coil 212 can be regarded as being in an almost stopped state even when the vehicle 200 is traveling.

In the configuration example shown in FIG. 2A, assuming that the secondary coil 212 moves at a constant speed in the x direction (i.e., rightward direction in FIG. 2A), the movement frequency $f_{212}$ of the secondary coil 212 can be calculated by the following equation (1):

$$f_{212} = 1/(p_{112}/v_{212}) \quad (1)$$

where $p_{112}$ is the pitch (m) of the primary coils 112 and $v_{212}$ is the movement speed (m/s) of the secondary coil 212.

The movement frequency $f_{212}$ can be considered as a frequency when the secondary coil 212 moves along the arrangement direction of the primary coils 112. For example, in the case of the movement frequency $f_{212}$ of the secondary coil 212 in the contactless power supply during traveling of the vehicle 200 being in the range of several tens of Hz to several hundreds of Hz, the frequency of the AC voltages applied to the primary coils 112 is set to a value in the range of several tens of kHz to several hundreds of kHz.

As above, setting the frequency of the AC voltages applied to the primary coils 112 to be sufficiently higher than the movement frequency $f_{212}$ of the secondary coil 212, with regard to the electric power transmission from the primary coils 112 to the secondary coil 212, the secondary coil 212 can be regarded as being in an almost stopped state even when the vehicle 200 is traveling. However, during traveling of the vehicle 200, the positional relationship between the primary coils 112 and the secondary coil 212 changes, resulting in variation in the transmitted electric power (or electric power pulsation); the electric power pulsation will be described later.

Figure 2B:
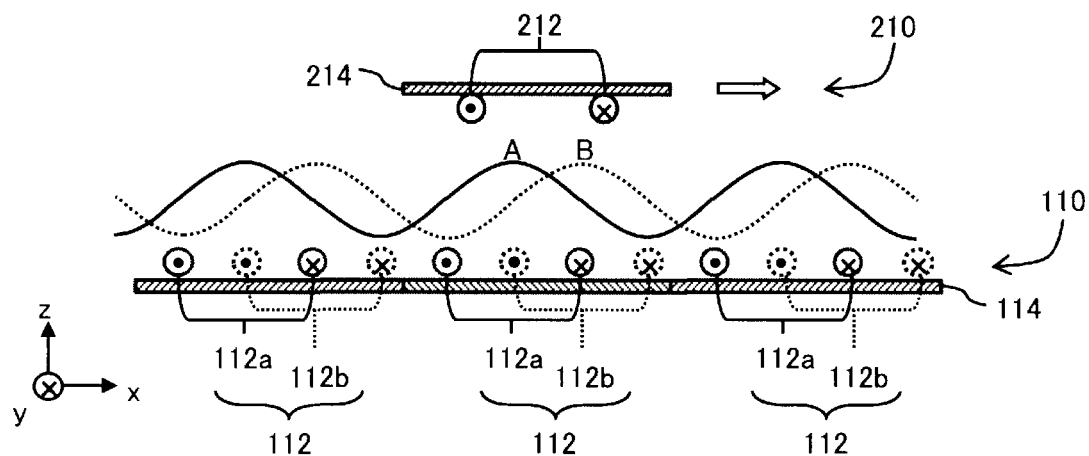
FIG. 2B is an explanatory diagram illustrating a coil configuration where each of primary coils is a two-phase coil and a secondary coil is a single-phase coil.

As shown in FIG. 2B, each of the primary coils 112 may alternatively be configured as a two-phase coil that consists of an A-phase coil 112a and a B-phase coil 112b, while the secondary coil 212 is configured as a single-phase coil. In FIG. 2B, there are depicted the waveforms of A-phase and B-phase voltages applied respectively to the A-phase and B-phase coils 112a and 112b of each of the primary coils 112. The frequency of the AC voltages applied to the primary coils 112 is set to a sufficiently high frequency such that with regard to the electric power transmission from the primary coils 112 to the secondary coil 212, the secondary coil 212 can be regarded as being in an almost stopped state even when the vehicle 200 is traveling.

Moreover, though not shown in the figures, the number of phases of each of the primary coils 112 may alternatively be set to be greater than or equal to four. In other words, each of the primary coils 112 may be configured as a multi-phase coil whose number of phases is greater than or equal to two, while the secondary coil 212 is configured as a single-phase coil.

Figure 2C:
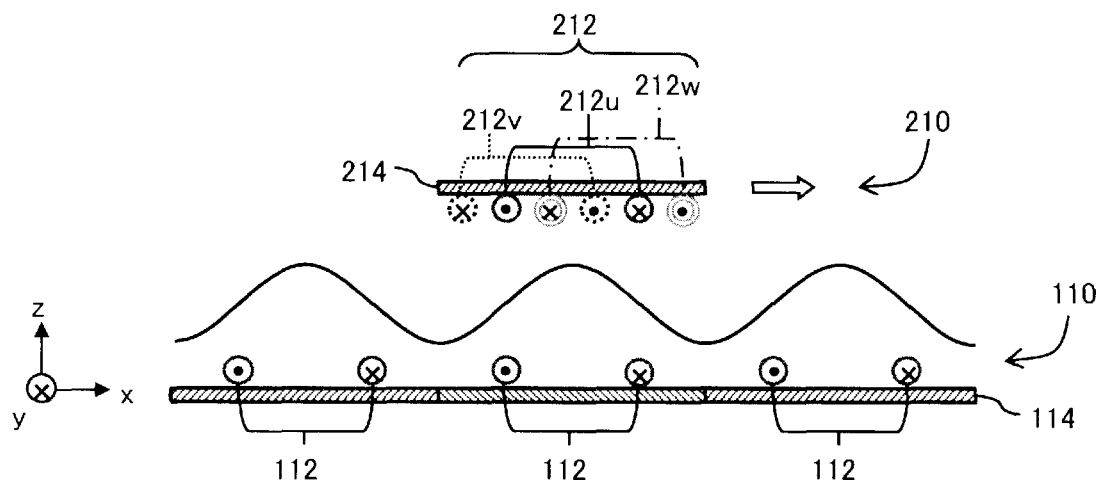
FIG. 2C is an explanatory diagram illustrating a coil configuration where each of primary coils is a single-phase coil and a secondary coil is a three-phase coil.
Figure 2D:
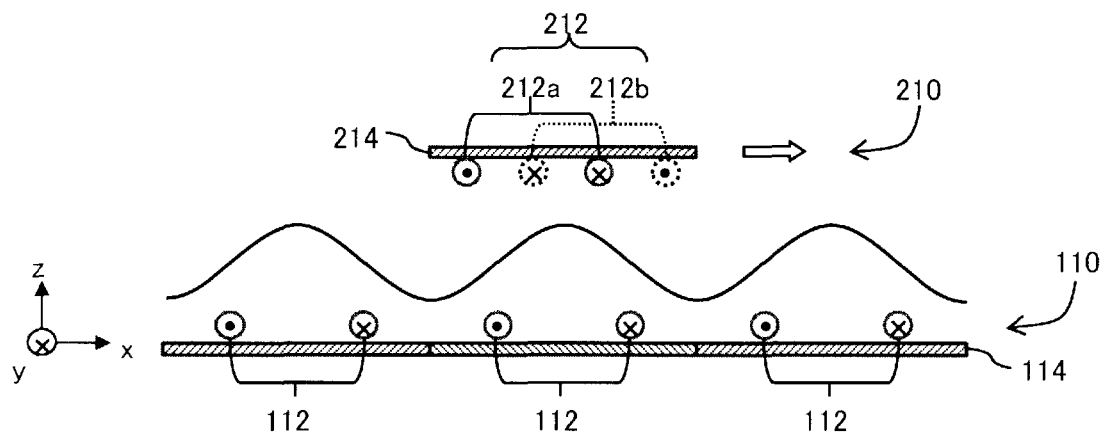
FIG. 2D is an explanatory diagram illustrating a coil configuration where each of primary coils is a single-phase coil and a secondary coil is a two-phase coil.

As shown in FIG. 2C, each of the primary coils 112 may be configured as a single-phase coil and the secondary coil 212 may be configured as a three-phase coil. Alternatively, as shown in FIG. 2D, the secondary coil 212 may be configured as a two-phase coil while each of the primary coils 112 is configured as a single-phase coil.

Moreover, though not shown in the figures, the number of phases of the secondary coil 212 may alternatively be set to be greater than or equal to four. In other words, the secondary coil 212 may be configured as a multi-phase coil whose number of phases is greater than or equal to two, while each of the primary coils 112 is configured as a single-phase coil.

As can be understood from the above explanation, it is preferable to configure the primary coils 112 and the secondary coil 212 such that each of the primary coils 112 is a single-phase coil with the secondary coil 212 being a multi-phase coil, or is a multi-phase coil with the secondary coil 212 being a single-phase coil. In this case, it is possible to perform electric power supply having less electric power pulsation with a simpler configuration during traveling of the vehicle 200 in comparison with the case of configuring each of the primary coils 112 and the secondary coil 212 as a multi-phase coil. This advantageous effect will be further described later.

As shown in FIGS. 3A-3F, the power-transmitting coil units 110 and the power-receiving coil unit 210 include respective resonant capacitors 116 and 216. There are the following typical types of resonant circuits formed of the resonant capacitors 116 and 216.

(1) S-S(Series Primary Side-Series Secondary Side) Type

Figure 3A:
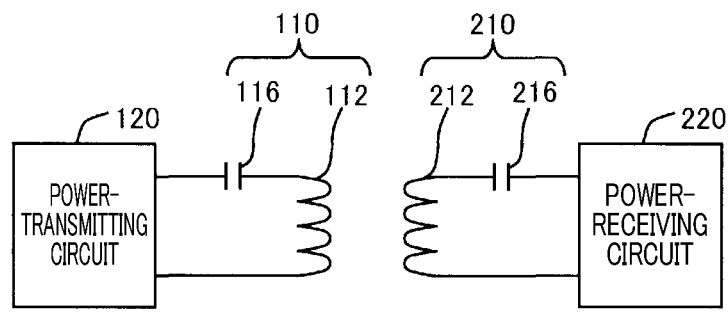
FIG. 3A is an explanatory diagram illustrating an S-S (Series primary side-Series secondary side) resonant circuit.

As shown in FIG. 3A, in an S-S resonant circuit, the primary coil 112 of each of the power-transmitting coil units 110 is connected in series with a resonant capacitor 116 while the secondary coil 212 of the power-receiving coil unit 210 is connected in series with a resonant capacitor 216.

(2) P-P (Parallel Primary Side-Parallel Secondary Side) Type

Figure 3B:
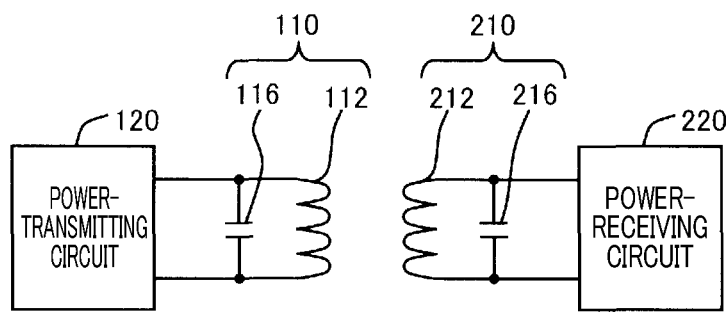
FIG. 3B is an explanatory diagram illustrating a P-P (Parallel primary side-Parallel secondary side) resonant circuit.

As shown in FIG. 3B, in a P-P resonant circuit, the primary coil 112 of each of the power-transmitting coil units 110 is connected in parallel to a resonant capacitor 116 while the secondary coil 212 of the power-receiving coil unit 210 is connected in parallel to a resonant capacitor 216.

(3) P-S (Parallel Primary Side-Series Secondary Side) Type

Figure 3C:
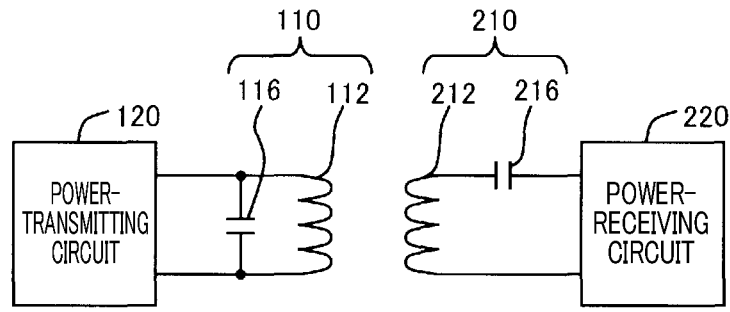
FIG. 3C is an explanatory diagram illustrating a P-S (Parallel primary side-Series secondary side) resonant circuit.

As shown in FIG. 3C, in a P-S resonant circuit, the primary coil 112 of each of the power-transmitting coil units 110 is connected in parallel to a resonant capacitor 116 while the secondary coil 212 of the power-receiving coil unit 210 is connected in series with a resonant capacitor 216.

(4) S-P (Series Primary Side-Parallel Secondary Side) Type

Figure 3D:
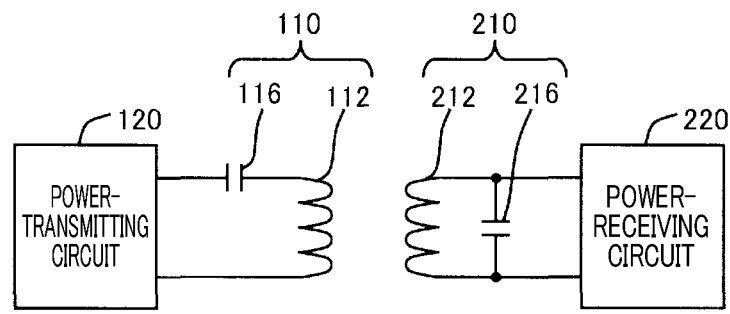
FIG. 3D is an explanatory diagram illustrating an S-P (Series primary side-Parallel secondary side) resonant circuit.

As shown in FIG. 3D, in an S-P resonant circuit, the primary coil 112 of each of the power-transmitting coil units 110 is connected in series with a resonant capacitor 116 while the secondary coil 212 of the power-receiving coil unit 210 is connected in parallel to a resonant capacitor 216.

Figure 3E:
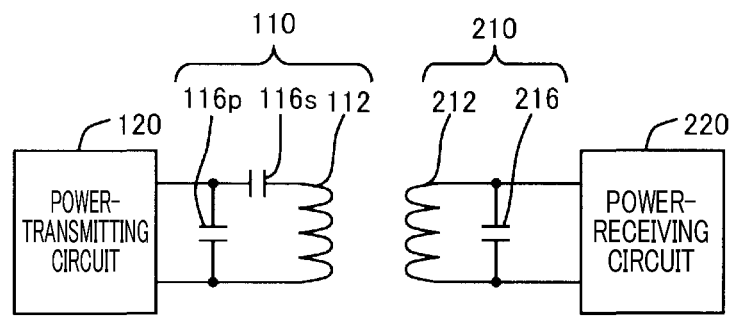
FIG. 3E is an explanatory diagram illustrating a PS-P (Parallel and Series primary side-Parallel secondary side) resonant circuit.
Figure 3F:
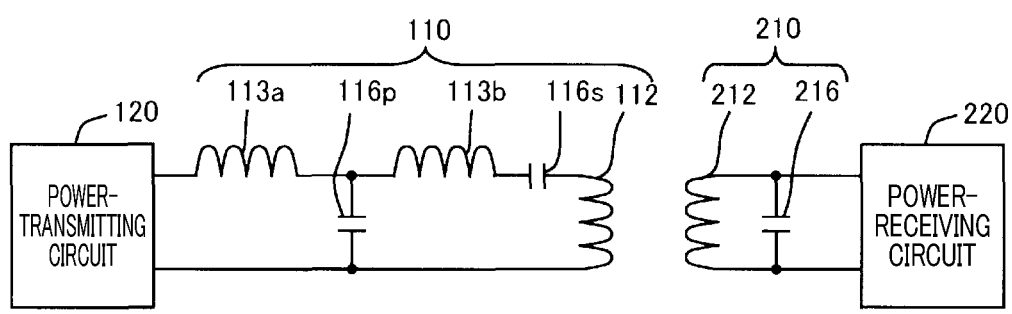
FIG. 3F is an explanatory diagram illustrating another type of resonant circuit.

FIGS. 3E and 3F illustrate other types of resonant circuits. In the resonant circuit shown in FIG. 3E, the primary coil 112 of each of the power-transmitting coil units 110 is connected in parallel to a resonant capacitor 116p and in series with a resonant capacitor 116s. The resonant circuit shown in FIG. 3F is obtained by adding two coils 113a and 113b to the resonant circuit shown in FIG. 3E. Specifically, in the resonant circuit shown in FIG. 3F, both the coils 113a and 113b are connected in series with the resonant capacitor 116s; one end of the resonant capacitor 116p is connected to a junction point between the coils 113a and 113b. The resonant circuits shown in FIGS. 3E and 3F are similar to the P-P resonant circuit shown in FIG. 3B in that the primary coil 112 and the secondary coil 212 have respective resonant capacitors connected in parallel thereto. In addition, in the resonant circuits shown in FIGS. 3E and 3F, the secondary coil 212 of the power-receiving coil unit 210 is connected in parallel to a resonant capacitor 216. However, it should be noted that the secondary coil 212 of the power-receiving coil unit 210 may alternatively be connected in other manners with one or more resonant capacitors.

It is preferable to employ a resonant circuit type in which the primary coil 112 of each of the power-transmitting coil units 110 has a resonant capacitor 116 connected in parallel thereto; the same also applies to the secondary coil 212. This is because in the case of having resonant capacitors connected respectively in parallel to the primary coil 112 and the secondary coil 212, the resonant current is less dependent on the coupling coefficient between the primary coil 112 and the secondary coil 212, making it possible to reduce electric power pulsation during traveling of the vehicle 200.

The various types of resonant circuits illustrated in FIGS. 3A-3F can be arbitrarily combined with the various coil configurations illustrated in FIGS. 2A-2D. In FIGS. 3A-3F, for the sake of simplicity, each of the primary coil 112 and the secondary coil 212 is depicted as a single coil. However, as described above with reference to FIGS. 2A-2D, it is preferable to configure the primary coil 112 and the secondary coil 212 such that one of the primary coil 112 and the secondary coil 212 is a single-phase coil and the other of the primary coil 112 and the secondary coil 212 is a multi-phase coil.

Figure 4A:
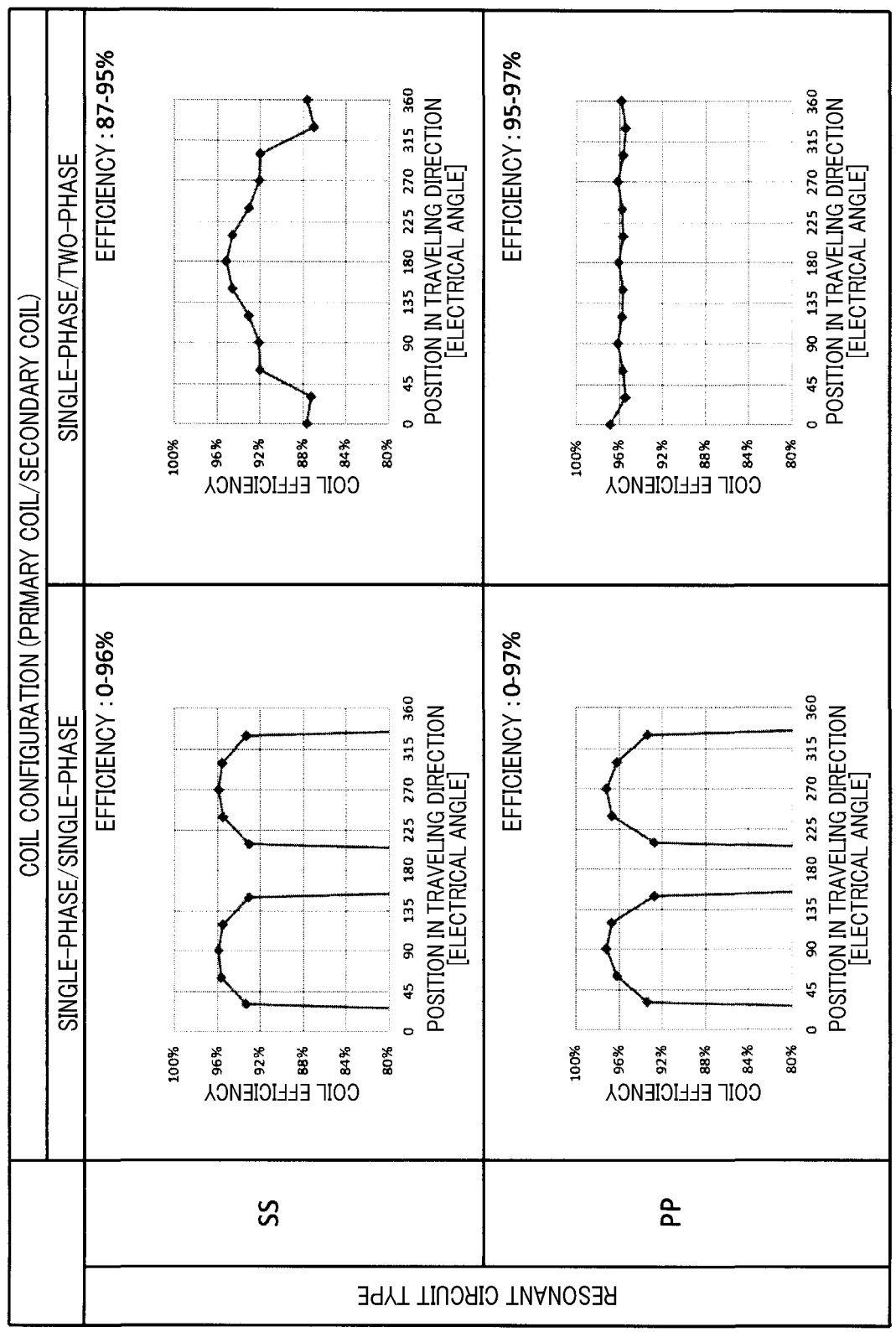
FIG. 4A is an explanatory diagram showing coil efficiency for each of four combinations of two coil configurations and two resonant circuit types.
Figure 4B:
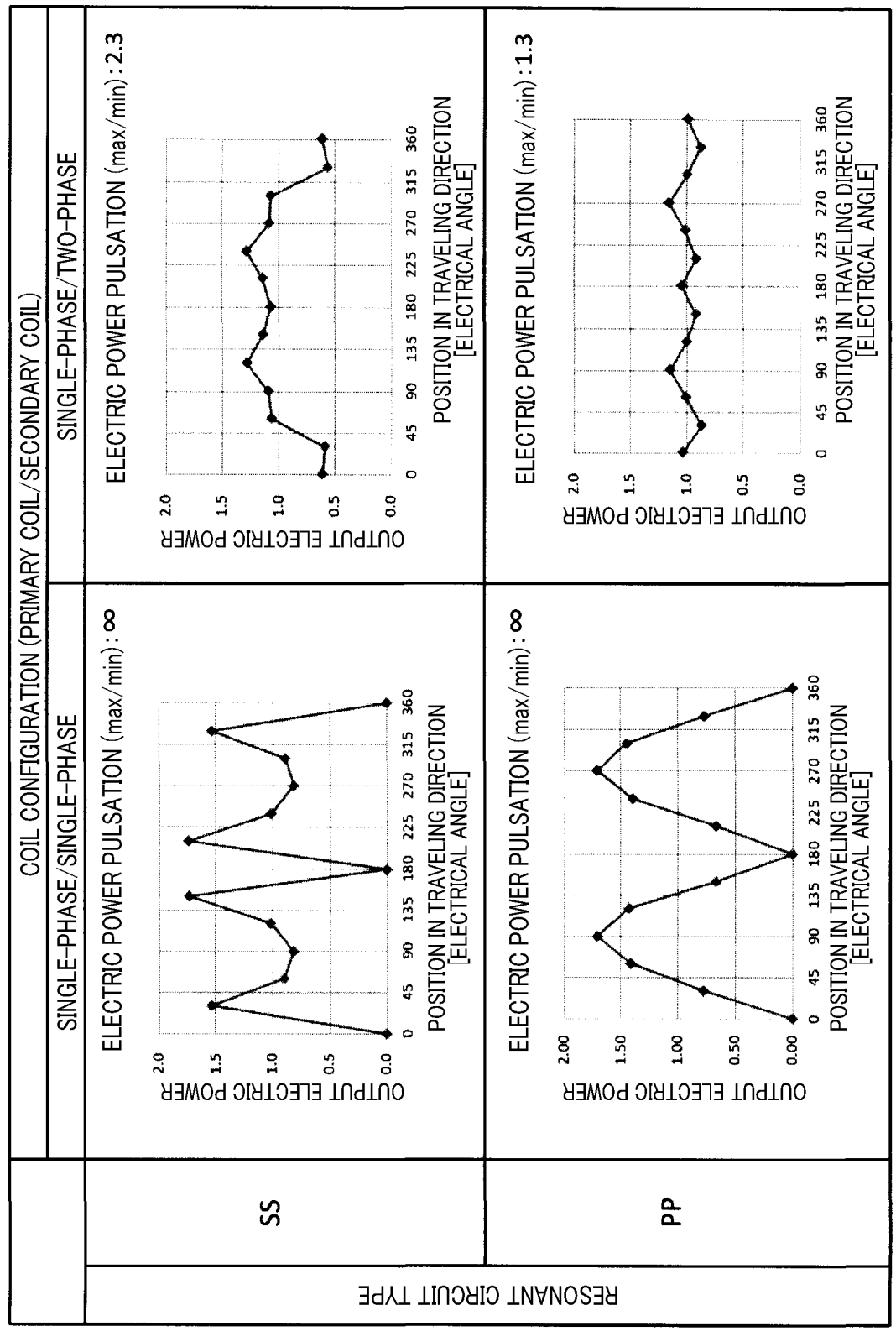
FIG. 4B is an explanatory diagram showing electric power pulsation for each of the four combinations of the two coil configurations and the two resonant circuit types.

As shown in FIGS. 4A and 4B, the electric power supply characteristics, which depend on the position of the secondary coil 212 in the traveling direction, vary between different combinations of coil configurations and resonant circuit types. Specifically, the electric power supply characteristics are evaluated, for each of four combinations of two coil configurations and two resonant circuit types, by a simulation under the condition that the vehicle 200 travels at a constant speed. The two coil configurations are the single-phase/single-phase coil configuration where each of the primary and secondary coils 112 and 212 is a single-phase coil and the single-phase/two-phase coil configuration where each of the primary coils 112 is a single-phase coil and the secondary coil 212 is a two-phase coil. The two resonant circuit types are the S-S type and the P-P type. As the evaluation results, the coil efficiency and the electric power pulsation are shown for each of the four combinations respectively in FIGS. 4A and 4B.

As shown in FIG. 4A, the coil efficiency depends on the position of the secondary coil 212 in the traveling direction. Here, "the position of the secondary coil 212 in the traveling direction" denotes the relative position of the secondary coil 212 to the primary coils 112 in the traveling direction of the vehicle 200 (i.e., the x direction in FIGS. 2A-2D). In the case of employing the single-phase/single-phase coil configuration, regarding the position of the secondary coil 212 in the traveling direction, there exist positions where the coil efficiency is zero. Here, "the coil efficiency is zero" denotes that no electric power can be received by the secondary coil 212. On the other hand, in the case of employing the single-phase/two-phase coil configuration, the coil efficiency is always higher than zero and kept stable at high values. In particular, in the case of employing the P-P resonant circuit in combination with the single-phase/two-phase coil configuration, the coil efficiency is higher and more stable than in the case of employing the S-S resonant circuit in combination with the single-phase/two-phase coil configuration. Therefore, the P-P resonant circuit is preferable to the S-S resonant circuit in terms of improving the coil efficiency. In addition, in the case of the number of phases of the secondary coil 212 being greater than or equal to three, the coil efficiency also has the same tendency as shown in FIG. 4A.

As shown in FIG. 4B, in the case of employing the single-phase/two-phase coil configuration, the electric power pulsation during traveling of the vehicle 200 is smaller than in the case of employing the single-phase/single-phase coil configuration. Therefore, the single-phase/two-phase coil configuration is preferable to the single-phase/single-phase coil configuration in terms of reducing the electric power pulsation. Here, the electric power pulsation is represented by the value obtained by dividing the maximum value of the output electric power by the minimum value of the output electric power. Moreover, in the case of employing the single-phase/single-phase coil configuration, since the electric power pulsation during traveling of the vehicle 200 is large, the instantaneous electric power for outputting the same average electric power is increased, thereby increasing the size and thus the manufacturing cost of the contactless power supply system. In addition, in the case of employing the single-phase/single-phase coil configuration, electric power may become unstable on the secondary side and thus battery deterioration may be caused by variation in the electric power inputted to the main battery 230. In contrast, in the case of employing the single-phase/two-phase coil configuration, since the electric power pulsation during traveling of the vehicle 200 is sufficiently small, it becomes possible to avoid the above problems occurring in the case of employing the single-phase/single-phase coil configuration. In particular, in the case of employing the P-P resonant circuit in combination with the single-phase/two-phase coil configuration, the electric power pulsation is smaller than in the case of employing the S-S resonant circuit in combination with the single-phase/two-phase coil configuration. Therefore, the P-P resonant circuit is preferable to the S-S resonant circuit in terms of reducing the electric power pulsation. Furthermore, though not shown in the figures, the P-P resonant circuit is also preferable to other types of resonant circuits, such as the S-P resonant circuit and the P-S resonant circuit, in terms of reducing the electric power pulsation. In addition, in the case of the number of phases of the secondary coil 212 being greater than or equal to three, the electric power pulsation also has the same tendency as shown in FIG. 4B.

Figure 4C:
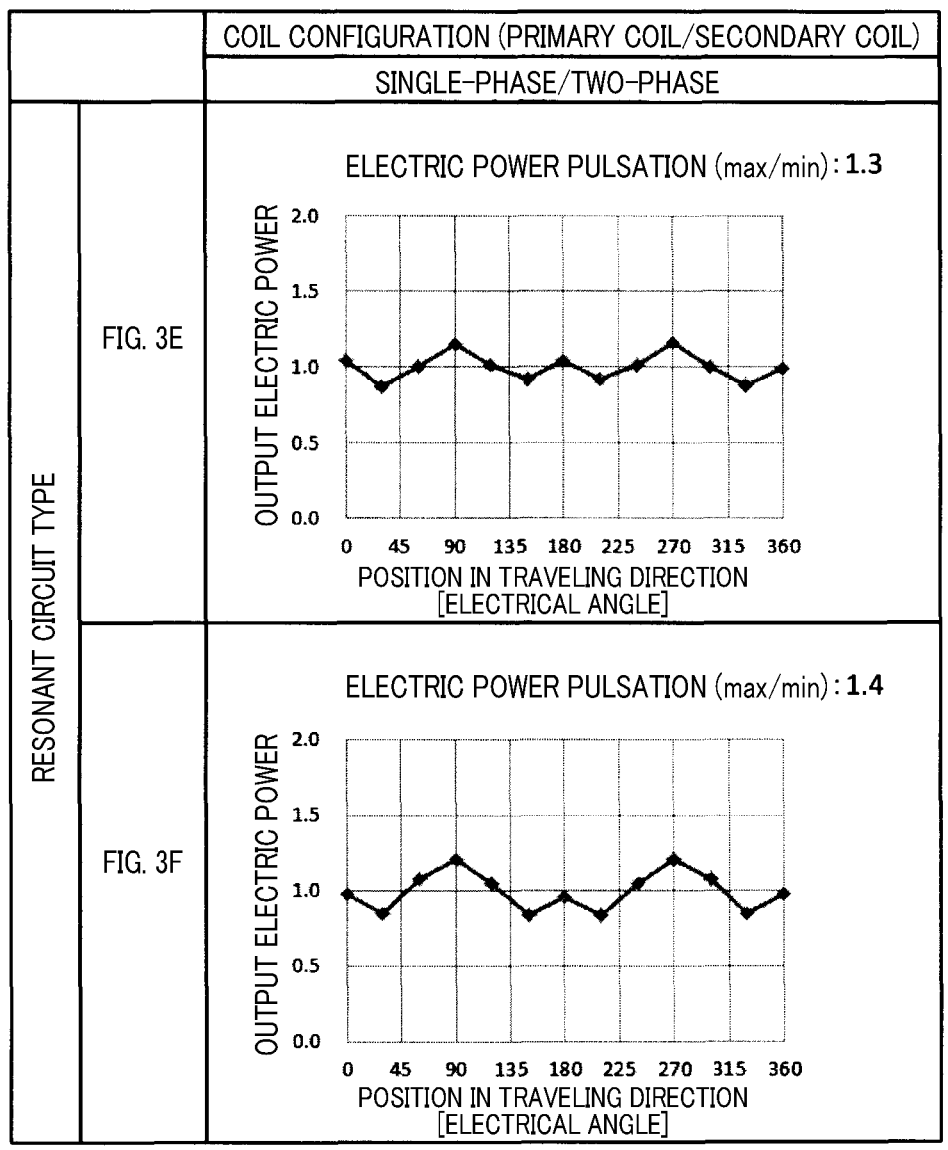
FIG. 4C is an explanatory diagram showing electric power pulsation for each of two combinations of one of the two coil configurations shown in FIGS. 4A and 4B and two other resonant circuit types.

As shown in FIG. 4C, in the case of employing the resonant circuit shown in FIG. 3E in combination with the single-phase/two-phase coil configuration and in the case of employing the resonant circuit shown in FIG. 3F in combination with the single-phase/two-phase coil configuration, it is also possible to sufficiently reduce the electric power pulsation. In addition, in the case of the number of phases of the secondary coil 212 being greater than or equal to three, the electric power pulsation also has the same tendency as shown in FIG. 4C.

FIG. 5 shows the results of evaluating four coil configurations in terms of coil efficiency, electric power pulsation, displacement robustness and infrastructure cost. Specifically, in FIG. 5, the #1 coil configuration is a configuration where each of the primary and secondary coils 112 and 212 is a single-phase coil. The #2 coil configuration is a configuration where each of the primary coils 112 is a multi-phase coil and the secondary coil 212 is a single-phase coil. The #3 coil configuration is a configuration where each of the primary coils 112 is a single-phase coil and the secondary coil 212 is a multi-phase coil. The #4 coil configuration is a configuration where each of the primary and secondary coils 112 and 212 is a multi-phase coil. In addition, the #1 to #4 coil configurations were evaluated by the same simulation as the coil configurations shown in FIGS. 4A and 4B.

In terms of coil efficiency, the #2 to #4 coil configurations are preferable to the #1 coil configuration, as explained above with reference to FIG. 4A.

In terms of electric power pulsation, the #2 to #4 coil configurations are also preferable to the #1 coil configuration, as explained above with reference to FIG. 4B.

In terms of displacement robustness, the #2 to #4 coil configurations are also preferable to the #1 coil configuration. Here, the displacement robustness represents the influence of change of the relative position between the primary coils 112 and the secondary coil 212 from an optimal position in the y direction and/or the z direction on the coil efficiency. The higher the displacement robustness, the smaller the change in the coil efficiency caused by displacement of the primary coils 112 and/or the secondary coil 212 in the y direction and/or the z direction.

In terms of infrastructure cost, the #1 coil configuration is most excellent; the #3 coil configuration is sufficiently excellent; the #2 coil configuration is slightly inferior to the #3 coil configuration; and the #4 coil configuration is most inferior. Here, the term "infrastructure cost" denotes the cost of the entire contactless power supply system (i.e., the cost of the contactless power supply apparatus 100 and those components of the vehicle 200 which are necessary for the contactless power supply).

Considering all the characteristics shown in FIG. 5 together, it is preferable to employ the #2 coil configuration or the #3 coil configuration, and particularly preferable to employ the #3 coil configuration.

Figure 6B:
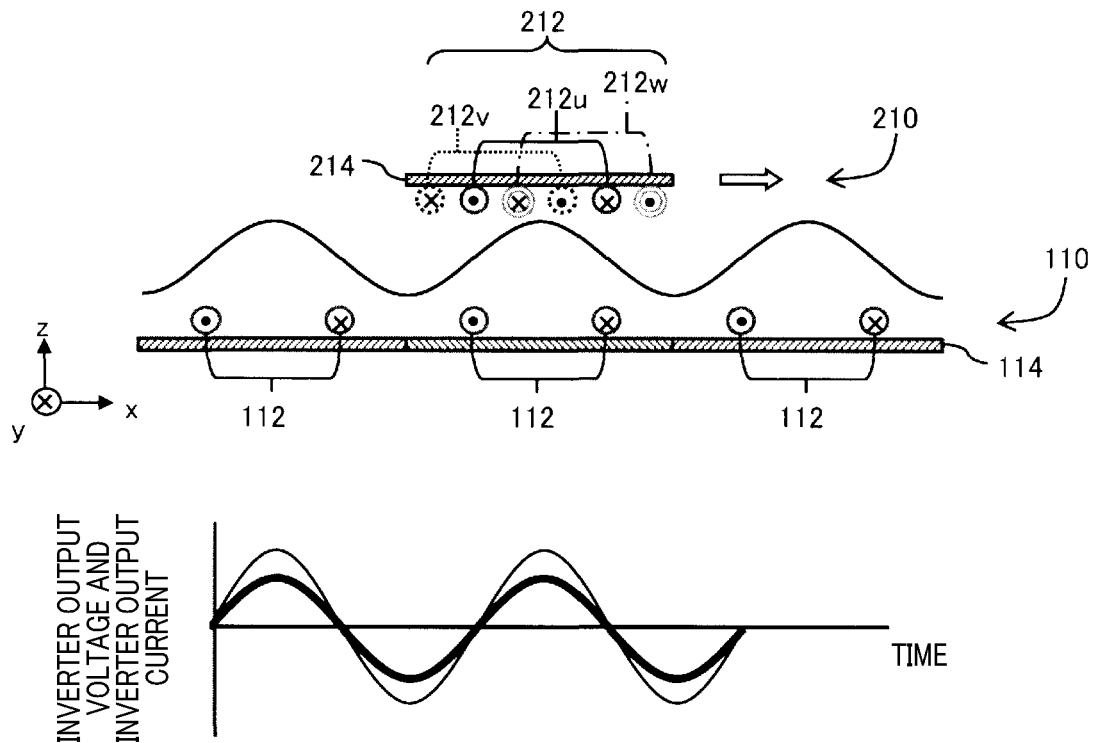
FIG. 6B is an explanatory diagram showing inverter outputs when each of primary coils is a single-phase coil and a secondary coil is a multi-phase coil.

As comparatively shown in FIGS. 6A and 6B, in terms of inverter efficiency, a single-phase/multi-phase coil configuration where each of the primary coils 112 is a single-phase coil and the secondary coil 212 is a multi-phase coil is preferable to a multi-phase/single-phase coil configuration where each of the primary coils 112 is a multi-phase coil and the secondary coil 212 is a single-phase coil. For example, the coil configuration shown in FIG. 6A is identical to the three-phase/single-phase coil configuration shown in FIG. 2A where each of the primary coils 112 is a three-phase coil and the secondary coil 212 is a single-phase coil. On the other hand, the coil configuration shown in FIG. 6B is identical to the single-phase/three-phase coil configuration shown in FIG. 2C where each of the primary coils 112 is a single-phase coil and the secondary coil 212 is a three-phase coil. In addition, in lower parts of FIGS. 6A and 6B, there are illustrated changes with time of the output voltages and output currents of the inverters of the power-transmitting circuits 120.

As shown in FIG. 6A, in the case of configuring each of the primary coils 112 as a multi-phase coil, there are differences between the coupling coefficients of the phase coils of each of the primary coils 112 with the secondary coil 212. Specifically, in the example shown in FIG. 6A, the coupling coefficient between the U-phase coil 112$u$ and the secondary coil 212 is larger than the coupling coefficients between the V-phase coil 112$v$ and the secondary coil 212 and between the W-phase coil 112$w$ and the secondary coil 212. Due to the differences between the coupling coefficients of the phase coils with the secondary coil 212, the impedances of the phase coils become different from each other. Consequently, even when the phase voltages applied respectively to the phase coils are equal to each other, the phase currents flowing respectively through the phase coils will become different from each other, resulting in imbalance between the phase currents. Moreover, the imbalance between the phase currents will cause differences in phase between the phase voltages and the phase currents, thereby lowering the power factor of the inverter of the corresponding power-transmitting circuit 120. As a result, with the lowering of the power factor, the loss in the inverter will be increased.

In contrast, as shown in FIG. 6B, in the case of configuring each of the primary coils 112 as a single-phase coil, it is possible to improve the power factors of the inverters of the power-transmitting circuits 120, thereby reducing the losses in the inverters. Moreover, in this case, it is possible to simplify the power-transmitting coil units 110 and the power-transmitting circuits 120, more specifically to simplify the shapes of the coils of the power-transmitting coil units 110 and reduce the number of elements of the power-transmitting circuits 120. As a result, it becomes possible to reduce the manufacturing cost of the contactless power supply system.

Figure 7A:
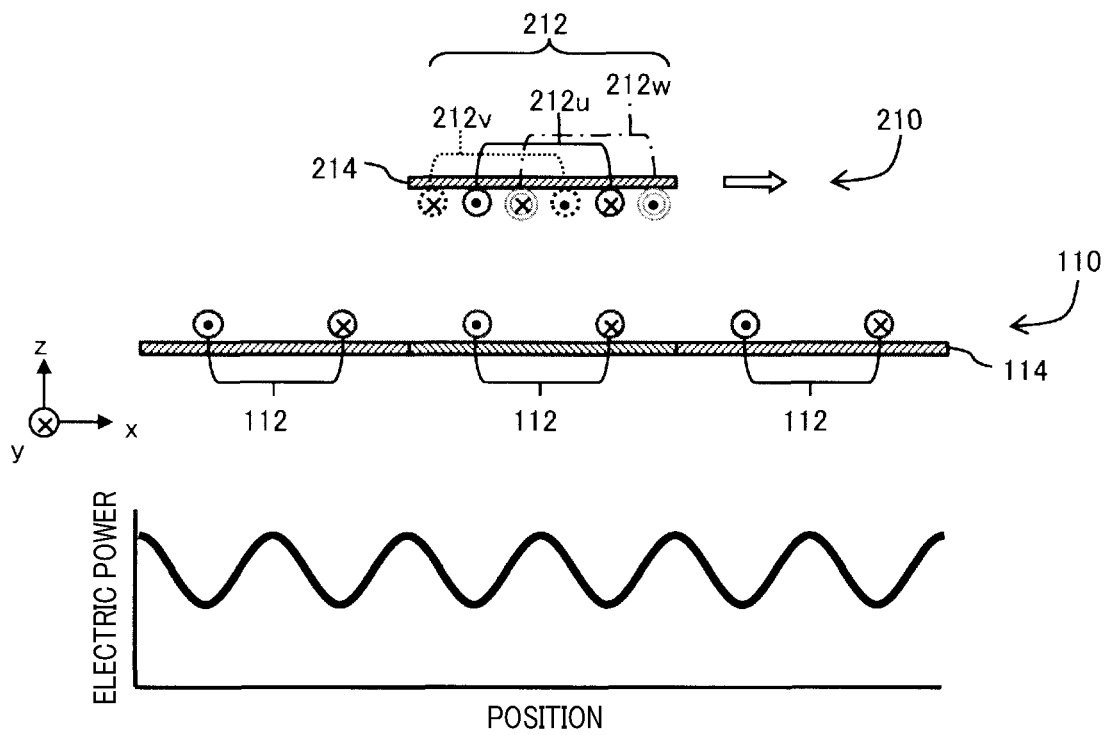
FIG. 7A is an explanatory diagram showing electric power pulsation when each of primary coils is a single-phase coil and a secondary coil is a three-phase coil.
Figure 7B:
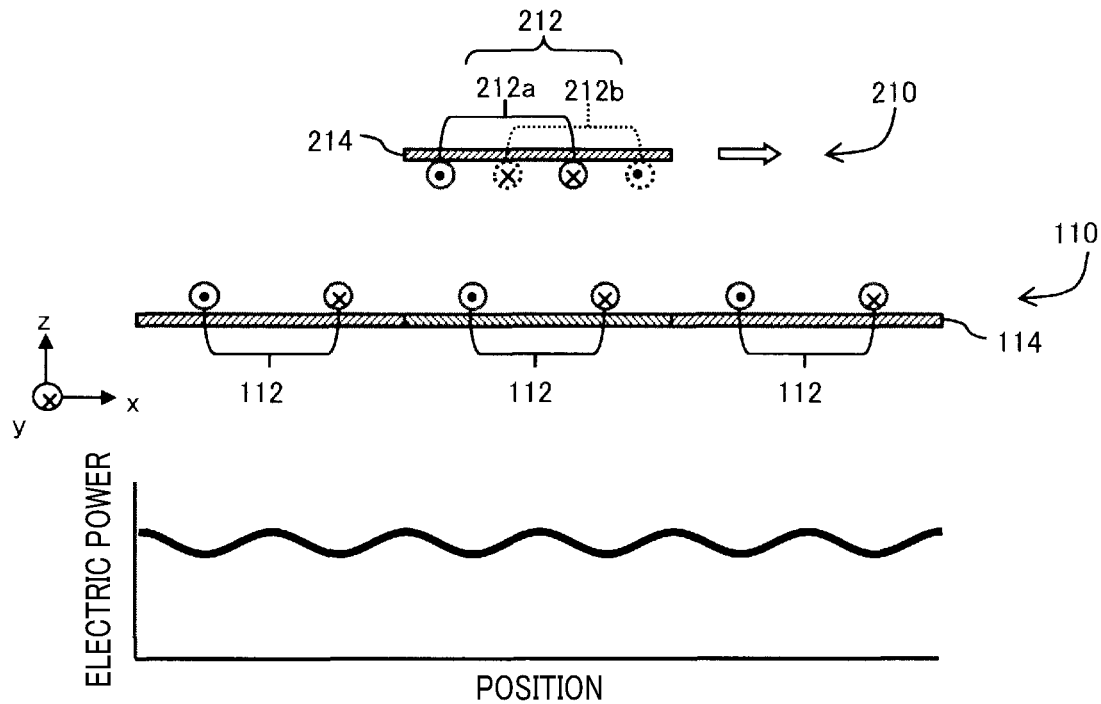
FIG. 7B is an explanatory diagram showing electric power pulsation when each of primary coils is a single-phase coil and a secondary coil is a two-phase coil.

As comparatively shown in FIGS. 7A and 7B, in terms of reducing the electric power pulsation during traveling of the vehicle 200, the single-phase/two-phase coil configuration where each of the primary coils 112 is a single-phase coil and the secondary coil 212 is a two-phase coil is preferable to the single-phase/three-phase coil configuration where each of the primary coils 112 is a single-phase coil and the secondary coil 212 is a three-phase coil. Specifically, the coil configuration shown in FIG. 7A is identical to the single-phase/three-phase coil configuration shown in FIG. 2C. On the other hand, the coil configuration shown in FIG. 7B is identical to the single-phase/two-phase coil configuration shown in FIG. 2D. In addition, in lower parts of FIGS. 7A and 7B, there is illustrated change with time of the output electric power of the inverters of the power-transmitting circuits 120.

As shown in FIG. 7A, in the case of configuring the secondary coil 212 as a three-phase coil, U-phase, V-phase and W-phase coils 212$u$, 212$v$ and 212$w$ of the secondary coil 212 are arranged such that the U-phase coil 212$u$ is located in a central part while the V-phase and W-phase coils 212$v$ and 212$w$ are located respectively in opposite end parts of the secondary coil 212 in the x direction. Consequently, imbalance occurs between the electrical characteristics (more specifically, the impedances) of the three phases, causing electric power pulsation to occur. In addition, when the imbalance occurs, the frequency of the output electric power becomes twice the frequency of the output voltage and the output current.

In contrast, as shown in FIG. 7B, in the case of configuring the secondary coil 212 as a two-phase coil, a first-phase coil 212$a$ and a second-phase coil 212$b$ of the secondary coil 212 are located respectively at two equivalent positions. Consequently, there is no difference between the electrical characteristics of the two phases. As a result, the electric power pulsation in this case becomes smaller than that in the case of configuring the secondary coil 212 as a three-phase coil.

Figure 8A:
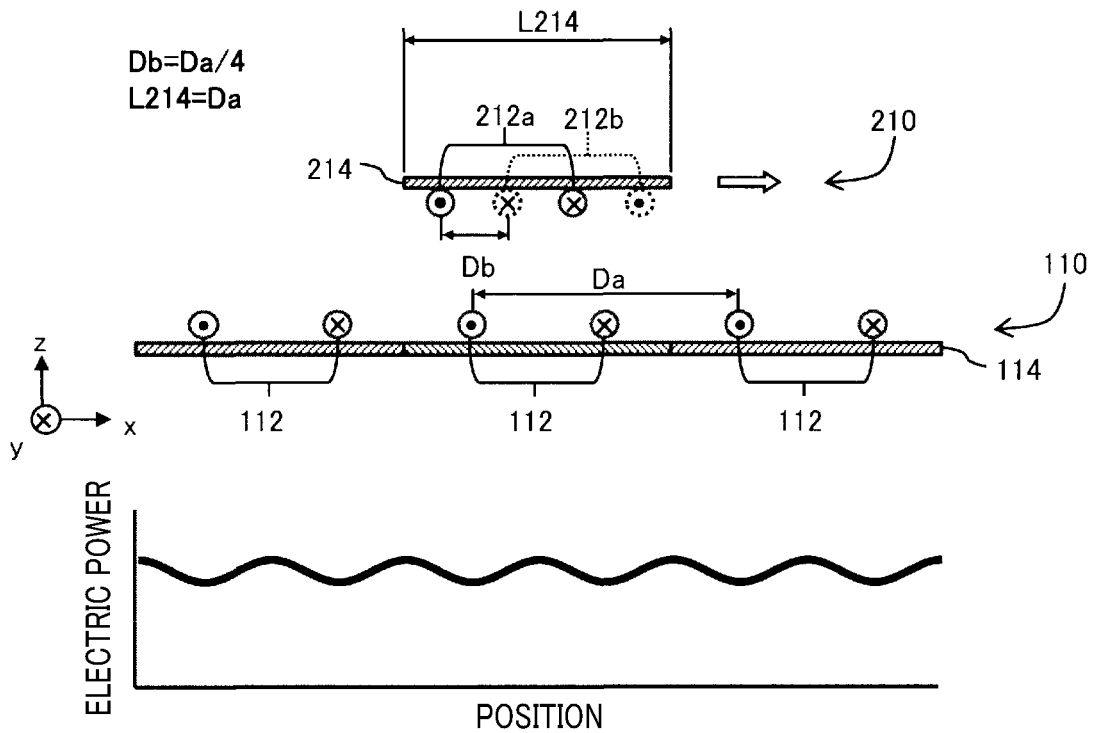
FIG. 8A is an explanatory diagram showing electric power pulsation when a power-receiving coil unit having a reference configuration is employed in the contactless power supply system.

FIG. 8A shows a reference configuration of the power-receiving coil unit 210 which includes the same secondary coil 212 as employed in the single-phase/two-phase coil configuration shown in FIG. 7B. In FIG. 8A, there are also illustrated the following parameters.

Da: a length corresponding to 360 degrees in electrical angle of the primary coils 112. It is equal to the pitch of the primary coils 112.

Db: an offset width between the first-phase and second-phase coils 212$a$ and 212$b$ of the two-phase secondary coil 212 in the x direction (i.e., the longitudinal direction of the vehicle 200).

L214: a length of the magnetic yoke 214 of the power-receiving coil unit 210 in the x direction.

In the reference configuration of the power-receiving coil unit 210 shown in FIG. 8A, Db is set to be equal to Da/4 (i.e., Db=Da/4) and L214 is set to be equal to Da (i.e., L214=Da). In addition, Da/4 represents a length corresponding to 90 degrees in electrical angle of the primary coils 112.

Figure 8B:
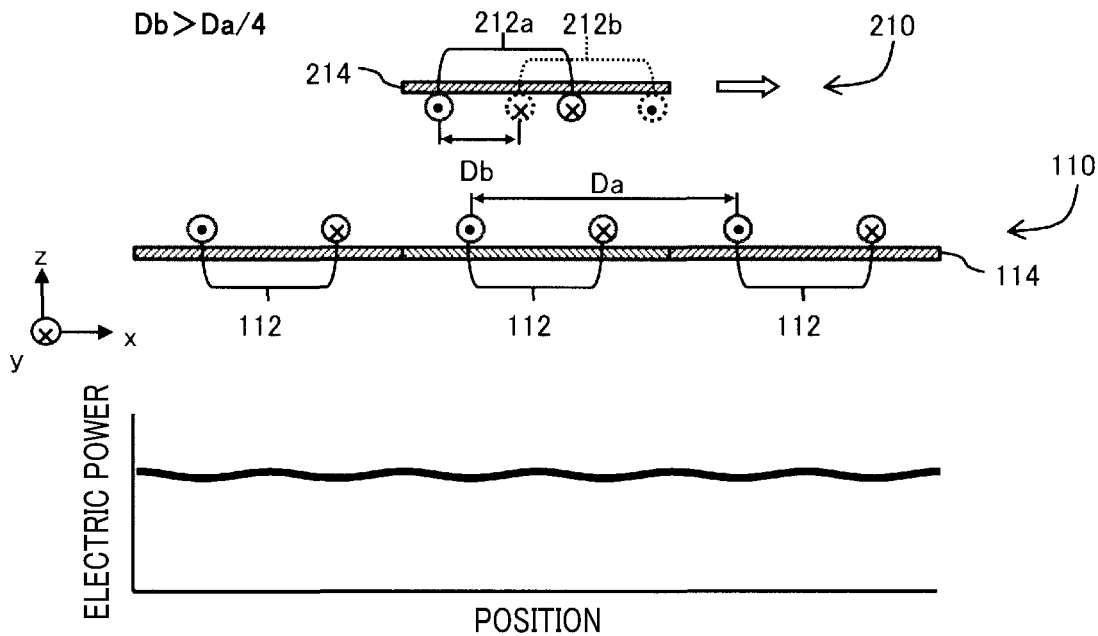
FIG. 8B is an explanatory diagram showing electric power pulsation when an offset width between phase coils of a two-phase secondary coil of the power-receiving coil unit is set to be greater than a length corresponding to 90 degrees in electrical angle of primary coils.

FIG. 8B shows a configuration of the power-receiving coil unit 210 where the offset width Db between the first-phase and second-phase coils 212$a$ and 212$b$ of the two-phase secondary coil 212 is set to be greater than Da/4 (i.e., Db>Da/4). When Db=Da/4 as in the reference configuration shown in FIG. 8A, the first-phase coil 212$a$ is arranged such that one of an outgoing coil wire and a returning coil wire of the first-phase coil 212a is located in an end part of the power-receiving coil unit 210 while the other of the outgoing coil wire and the returning coil wire is located in a central part of the power-receiving coil unit 210 in the x direction. Consequently, the magnetic flux due to the coil wire located in the end part of the power-receiving coil unit 210 is weakened, causing the magnetic position of the first-phase coil 212a to be equivalently shifted toward the center of the power-receiving coil unit 210. The same phenomenon also occurs in the second-phase coil 212b. Moreover, in the two-phase secondary coil 212, if the magnetic positions of the first-phase and second-phase coils 212a and 212b are not offset from each other by ¼ of one electrical angular period of the secondary coil 212, imbalance will occur in the electromotive forces of the first-phase and second-phase coils 212a and 212b, thereby causing electric power pulsation to occur. In view of the above, in the configuration of the power-receiving coil unit 210 shown in FIG. 8B, the offset width Db between the first-phase and second-phase coils 212a and 212b of the secondary coil 212 is set to be greater than Da/4 that represents a length corresponding to 90 degrees in electrical angle of the primary coils 112. Consequently, by offsetting the installation positions of the first-phase and second-phase coils 212a and 212b of the secondary coil 212 as above, it becomes possible to make the relative magnetic position between the first-phase and second-phase coils 212a and 212b approach ¼ of one electrical angular period of the secondary coil 212, thereby reducing the electric power pulsation. In addition, this advantageous effect can also be achieved in the case of the number of phases of a secondary coil 212 being greater than or equal to three; however, this advantageous effect is remarkable particularly when the secondary coil 212 is configured as a two-phase coil.

Figure 8C:
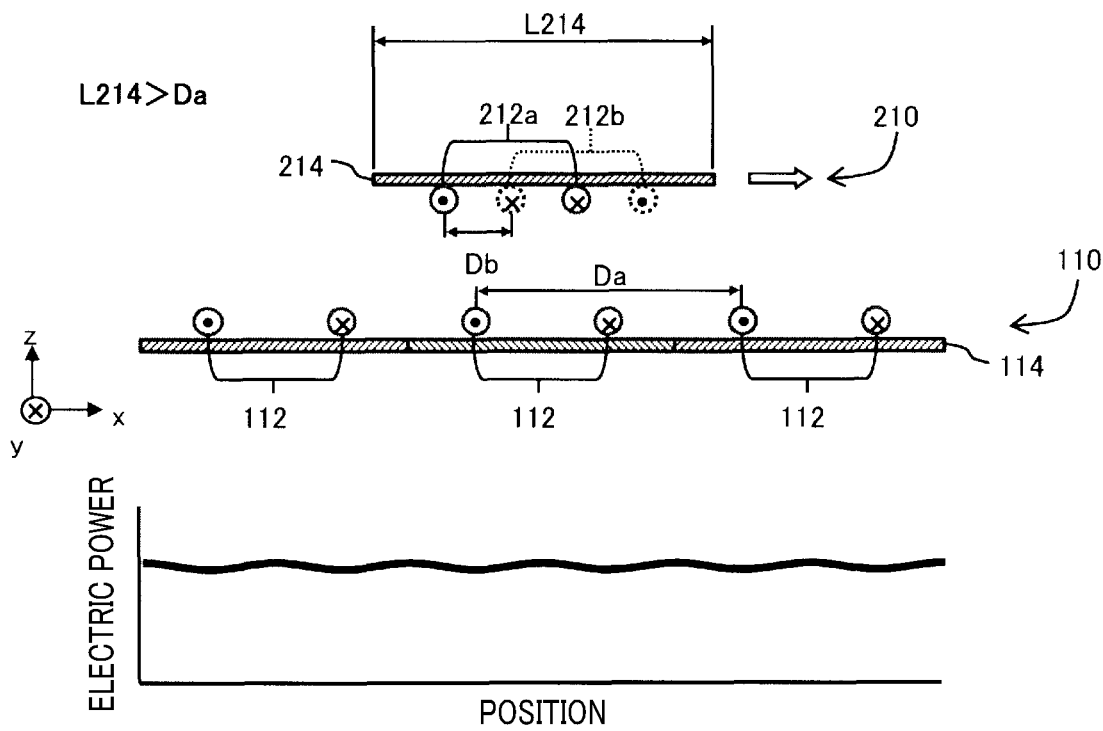
FIG. 8C is an explanatory diagram showing electric power pulsation when a length of a magnetic yoke of the power-receiving coil unit is set to be greater than a length corresponding to 360 degrees in electrical angle of the primary coils.

FIG. 8C shows a configuration of the power-receiving coil unit 210 where the length L214 of the magnetic yoke 214 is set to be greater than Da (i.e., L214>Da). As described above, in the reference configuration shown in FIG. 8A, the first-phase coil 212a is arranged such that one of an outgoing coil wire and a returning coil wire of the first-phase coil 212a is located on an end part of the magnetic yoke 214 while the other of the outgoing coil wire and the returning coil wire is located on a central part of the magnetic yoke 214 in the x direction. The second-phase coil 212b is also arranged in a similar manner to the first-phase coil 212a. Consequently, imbalance may occur in the electromotive forces of the first-phase and second-phase coils 212a and 212b, thereby causing electric power pulsation to occur. In view of the above, in the configuration of the power-receiving coil unit 210 shown in FIG. 8C, the length L214 of the magnetic yoke 214 is set to be greater than Da that represents a length corresponding to 360 degrees in electrical angle of the primary coils 112. Consequently, it becomes possible to make the relative magnetic position between the first-phase and second-phase coils 212a and 212b approach ¼ of one electrical angular period of the secondary coil 212, thereby reducing the electric power pulsation. In addition, this advantageous effect can also be achieved in the case of the number of phases of a secondary coil 212 being greater than or equal to three; however, this advantageous effect is remarkable particularly when the secondary coil 212 is configured as a two-phase coil.

Figure 9A:
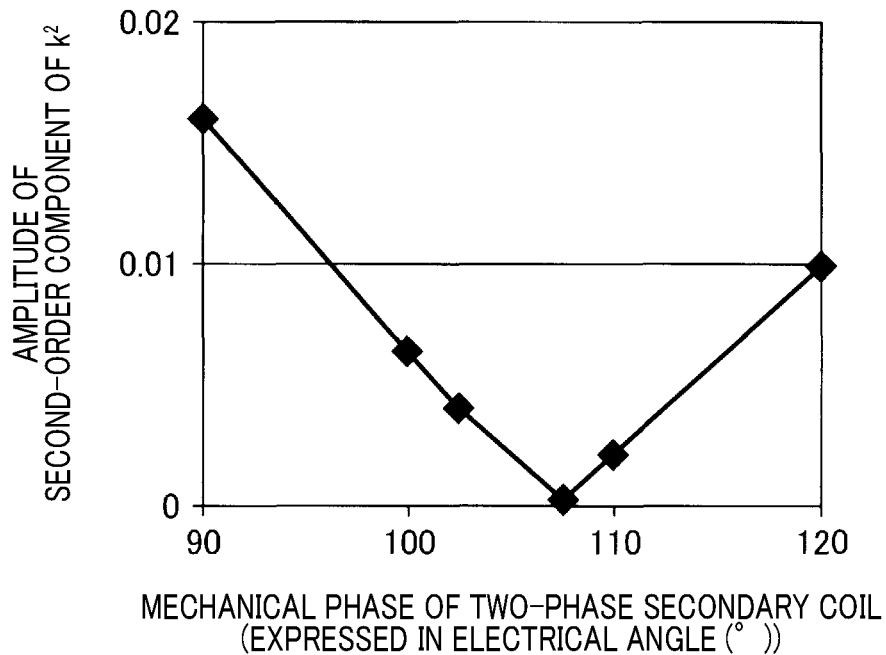
FIG. 9A is a graph illustrating the relationship between the mechanical phase of a two-phase secondary coil and the amplitude of a second-order component of the square of a coupling coefficient between each primary coil and the secondary coil.
Figure 9B:
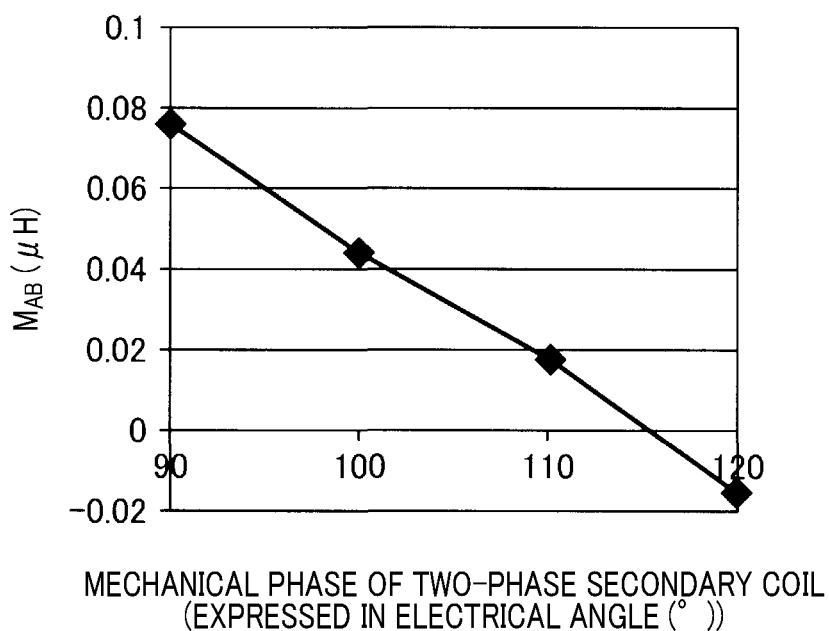
FIG. 9B is a graph illustrating the relationship between the mechanical phase of the two-phase secondary coil and the mutual inductance between first-phase and second-phase coils of the two-phase secondary coil.
Figure 9C:
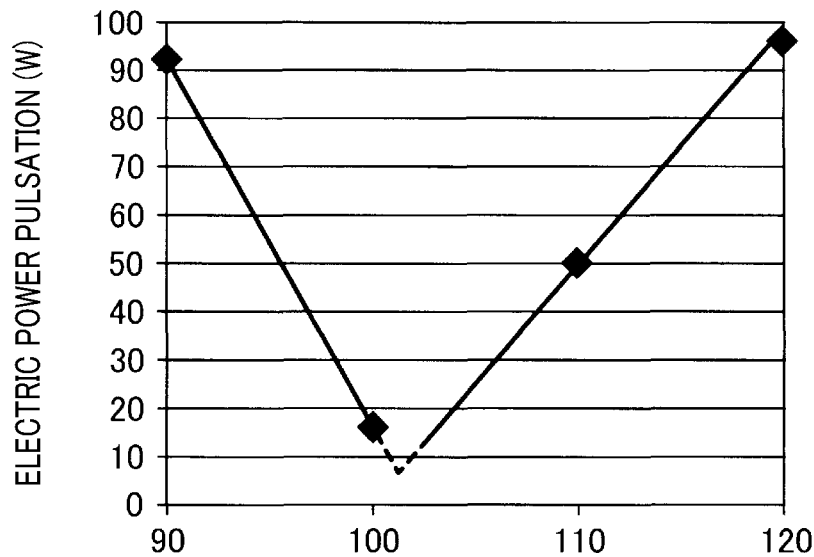
FIG. 9C is a graph illustrating the relationship between the mechanical phase of the two-phase secondary coil and electric power pulsation.

FIGS. 9A-9C show the results of a simulation performed using a two-phase secondary coil 212.

As shown in FIG. 9A, the amplitude of a second-order component of the square of the coupling coefficient k between each primary coil 112 and the secondary coil 212 depends on the mechanical phase of the secondary coil 212 (expressed in electrical angle (°) in FIG. 9A). Here, "the amplitude of a second-order component of the square of the coupling coefficient k" denotes the difference between a maximum value and a minimum value of $k^2$. In the coil configuration shown in FIGS. 2D and 7B, the following relationship is satisfied: $k^2=k1a^2+k1b^2$, where k1a is the coupling coefficient between the first-phase coil 212a of the secondary coil 212 and the primary coil 112 and k1b is the coupling coefficient between the second-phase coil 212b of the secondary coil 212 and the primary coil 112. Moreover, "the mechanical phase of the secondary coil 212" denotes the offset width Db between the first-phase and second-phase coils 212a and 212b of the secondary coil 212 expressed in electrical angle of the primary coils 112. Ideally the parameter $k^2$ would be constant irrespective of the relative position between the primary coils 112 and the secondary coil 212. However, in practice, the parameter $k^2$ changes slightly depending on the relative position between the primary coils 112 and the secondary coil 212; therefore, the second-order component of the parameter $k^2$ is not equal to zero. Moreover, in general, the amplitude of the coupling coefficient k is proportional to the voltage of the electric power received by the secondary coil 212 and the received electric power is proportional to the square of the voltage; therefore, the electric power pulsation, which represents the second-order component of the received electric power, is proportional to the amplitude of the second-order component of the square of the coupling coefficient k. Considering these characteristics, to reduce the electric power pulsation, it is preferable to minimize the amplitude of the second-order component of the square of the coupling coefficient k. More specifically, it is preferable to configure the secondary coil 212 so as to have the amplitude of the second-order component of the square of the coupling coefficient k in the range of 0 to 0.001. Moreover, according to the simulation results shown in FIG. 9A, it is preferable to set the mechanical phase of the secondary coil 212 to a value in the range of (107±2) degrees in electrical angle of the primary coils 112.

As shown in FIG. 9B, the mutual inductance Mab between the first-phase and second-phase coils 212a and 212b of the secondary coil 212 also depends on the mechanical phase of the secondary coil 212 (expressed in electrical angle (°) in FIG. 9B). The mutual inductance Mab contributes to reactive power; therefore, to reduce the electric power pulsation, it is preferable to minimize the absolute value of the mutual inductance Mab. Specifically, it is preferable to configure the secondary coil 212 so as to have the mutual inductance Mab in the range of (0±0.01) μH. Moreover, according to the simulation results shown in FIG. 9B, it is preferable to set the mechanical phase of the secondary coil 212 to a value in the range of (115±2) degrees in electrical angle of the primary coils 112.

As shown in FIG. 9C, the electric power pulsation also depends on the mechanical phase of the secondary coil 212 (expressed in electrical angle (°) in FIG. 9C). According to the simulation results shown in FIG. 9C, to reduce the electric power pulsation, it is preferable to set the mechanical phase of the secondary coil 212 to a value in the range of (102±6) degrees in electrical angle of the primary coils 112; it is more preferable to set the same to a value in the range of (102±4) degrees in electrical angle of the primary coils 112; it is most preferable to set the same to a value in the range of (102±2) degrees in electrical angle of the primary coils 112.

The simulation results shown in FIG. 9C correspond to the results obtained in the case of taking into account both the influence of the amplitude of the second-order component of the square of the coupling coefficient k illustrated in FIG. 9A and the influence of the mutual inductance Mab illustrated in FIG. 9B. The preferable ranges of the mechanical phase of the secondary coil 212 illustrated in FIGS. 9A-9C are different from each other. It is possible to suitably choose any of the preferable ranges taking into account other factors.

In addition, it should be noted that the simulation, the results of which are shown in FIGS. 9A-9C, was performed with the primary and secondary coils 112 and 212 in a state of being not offset from each other in the y-direction, i.e., performed with the centerlines of the primary and secondary coils 112 and 212 coinciding with each other.

Figure 10A:
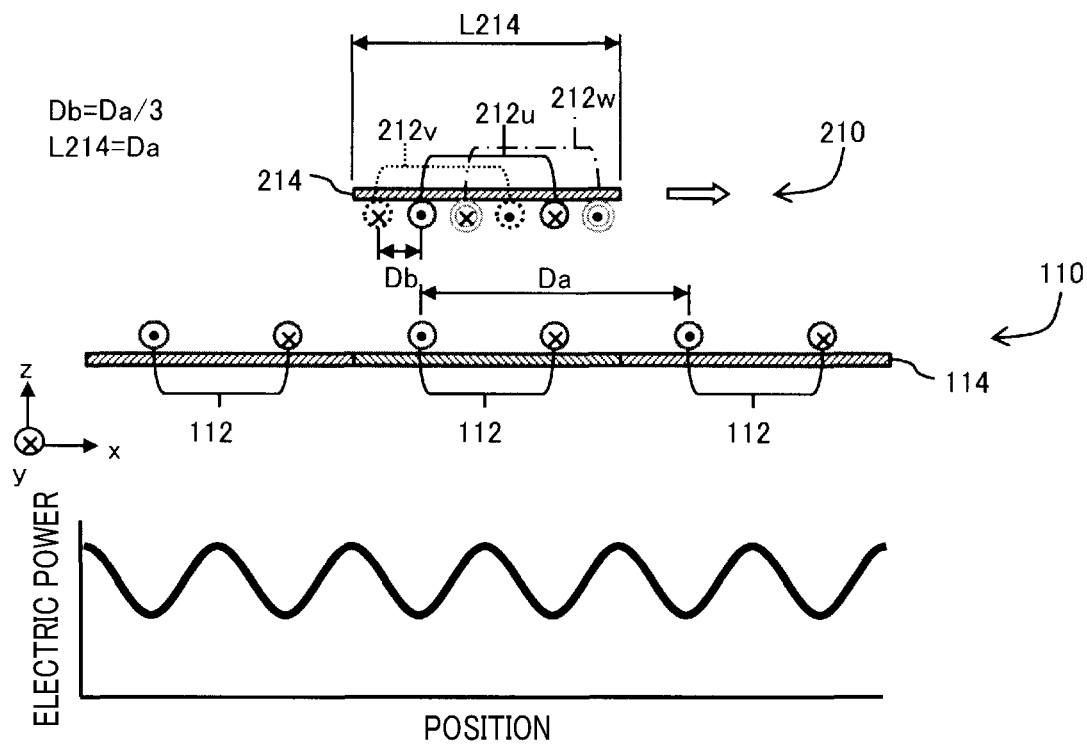
FIG. 10A is an explanatory diagram showing electric power pulsation when a three-phase secondary coil having a reference configuration is employed.
Figure 10B:
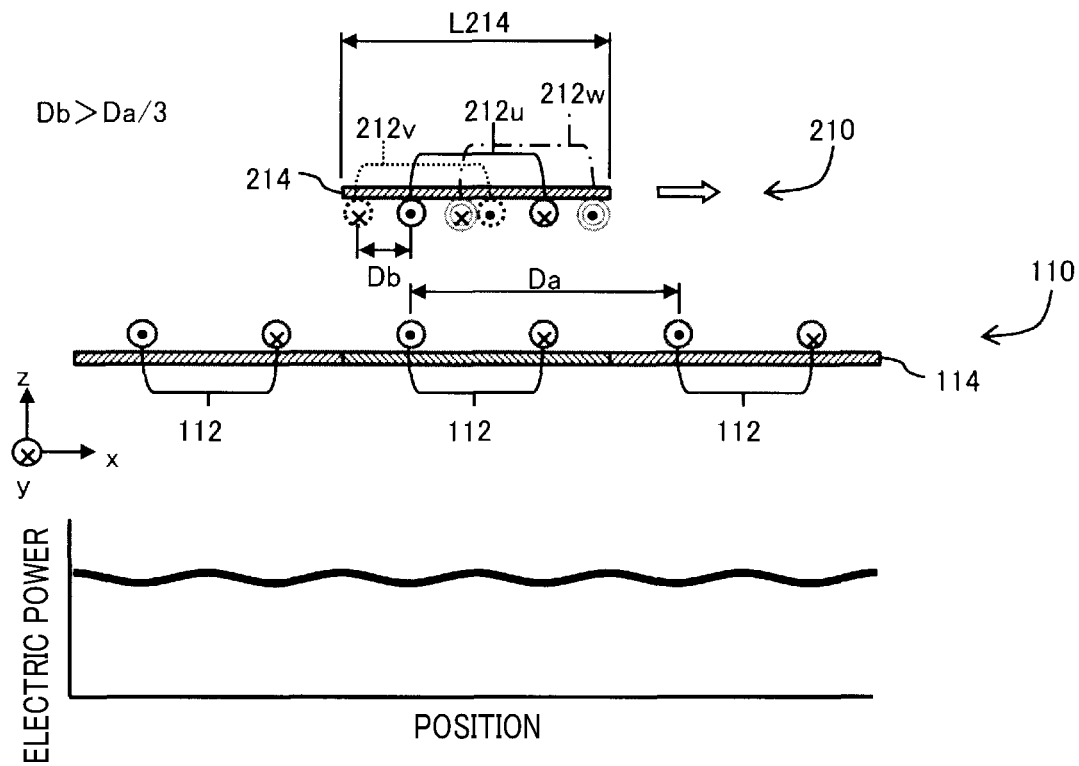
FIG. 10B is an explanatory diagram showing electric power pulsation when an offset width between phase coils of a three-phase secondary coil is set to be greater than a length corresponding to 120 degrees in electrical angle of primary coils.
Figure 10C:
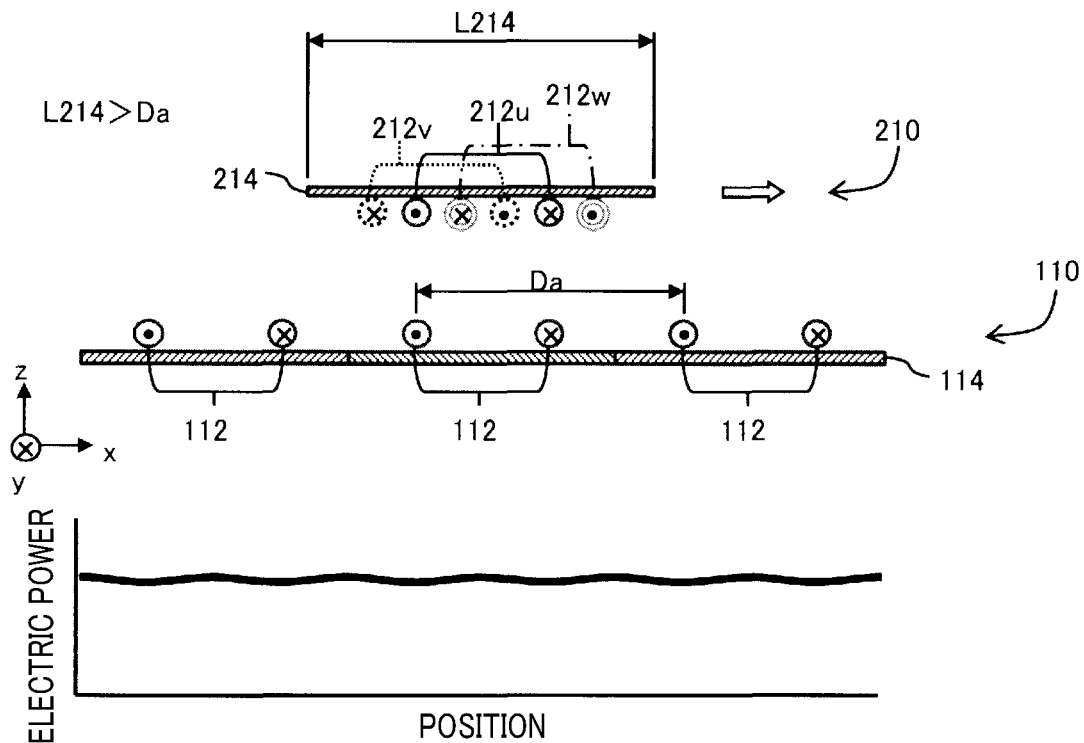
FIG. 10C is an explanatory diagram showing electric power pulsation when a length of a magnetic yoke provided for a three-phase secondary coil is set to be greater than a length corresponding to 360 degrees in electrical angle of primary coils.

FIGS. 10A-10C show configurations of the power-receiving coil unit 210 where the secondary coil 212 is a three-phase coil and which respectively correspond to the above-described configurations of the power-receiving coil unit 210 shown in FIGS. 8A-8C. In FIG. 10A, there are also illustrated the following parameters.

Da: a length corresponding to 360 degrees in electrical angle of the primary coils 112.

Db: an offset width between the V-phase coil 212v, U-phase coil 212u and W-phase coil 212w of the three-phase secondary coil 212 in the x direction (i.e., the longitudinal direction of the vehicle 200).

L214: a length of the magnetic yoke 214 of the power-receiving coil unit 210 in the x direction.

In the configuration of the power-receiving coil unit 210 shown in FIG. 10A, Db is set to be equal to Da/3 (i.e., Db=Da/3) and L214 is set to be equal to Da (i.e., L214=Da). Here, Da/3 represents a length corresponding to 120 degrees in electrical angle of the primary coils 112. Moreover, in a lower part of FIG. 10A, there is illustrated change of the transmitted electric power during traveling of the vehicle 200 (i.e., change of the transmitted electric power with movement of the secondary coil 212 in the x direction).

In the configuration of the power-receiving coil unit 210 shown in FIG. 10B, the offset width Db between the V-phase coil 212v, U-phase coil 212u and W-phase coil 212w of the three-phase secondary coil 212 is set to be greater than Da/3 (i.e., Db>Da/3). When Db=Da/3 as in the configuration shown in FIG. 10A, the V-phase coil 212v is arranged such that one of an outgoing coil wire and a returning coil wire of the V-phase coil 212v is located in an end part of the power-receiving coil unit 210 while the other of the outgoing coil wire and the returning coil wire is located in a central part of the power-receiving coil unit 210 in the x direction. Consequently, the magnetic flux due to the coil wire located in the end part of the power-receiving coil unit 210 is weakened, causing the magnetic position of the V-phase coil 212v to be equivalently shifted toward the center of the power-receiving coil unit 210. The same phenomenon also occurs in the W-phase coil 212w. Moreover, in the three-phase secondary coil 212, if the magnetic positions of the three phase coils 212v, 212u and 212w are not offset from each other by ⅓ of one electrical angular period of the secondary coil 212, imbalance will occur in the electromotive forces of the three phase coils 212v, 212u and 212w, thereby causing electric power pulsation to occur. In view of the above, in the configuration of the power-receiving coil unit 210 shown in FIG. 10B, the offset width Db between the three phase coils 212v, 212u and 212w of the secondary coil 212 is set to be greater than Da/3 that represents a length corresponding to 120 degrees in electrical angle of the primary coils 112. Consequently, by offsetting the installation positions of the three phase coils 212v, 212u and 212w of the secondary coil 212 as above, it becomes possible to make the relative magnetic positions between the three phase coils 212v, 212u and 212w approach ⅓ of one electrical angular period of the secondary coil 212, thereby reducing the electric power pulsation. Moreover, this advantageous effect can also be achieved in the case of the number of phases of a secondary coil 212 being greater than three. Specifically, in the case of the number of phases of a secondary coil 212 being equal to M, where M is an integer greater than or equal to three, it is preferable to set the offset width Db between M phase coils of the secondary coil 212 in the x direction to be greater than a length corresponding to (360÷M) degrees in electrical angle of the primary coils 112. In addition, the number M of phases of the secondary coil 212 is generally set to a prime number.

In the configuration of the power-receiving coil unit 210 shown in FIG. 10C, the length L214 of the magnetic yoke 214 is set to be greater than Da (i.e., L214>Da). As described above, in the configuration shown in FIG. 10A, the V-phase coil 212v is arranged such that one of an outgoing coil wire and a returning coil wire of the V-phase coil 212v is located on an end part of the magnetic yoke 214 while the other of the outgoing coil wire and the returning coil wire is located on a central part of the magnetic yoke 214 in the x direction. The W-phase coil 212w is also arranged in a similar manner to the V-phase coil 212v. Consequently, imbalance may occur in the electromotive forces of the three phase coils 212v, 212u and 212w of the secondary coil 212, thereby causing electric power pulsation to occur. In view of the above, in the configuration of the power-receiving coil unit 210 shown in FIG. 10C, the length L214 of the magnetic yoke 214 is set to be greater than Da that represents a length corresponding to 360 degrees in electrical angle of the primary coils 112. Consequently, it becomes possible to make the relative magnetic positions between the three phase coils 212v, 212u and 212w of the secondary coil 212 approach ⅓ of one electrical angular period of the secondary coil 212, thereby reducing the electric power pulsation. Moreover, this advantageous effect can also be achieved in the case of the number of phases of a secondary coil 212 being greater than three. Specifically, in the case of the number M of phases of a secondary coil 212 being greater than or equal to three, it is preferable to set the offset width Db between M phase coils of the secondary coil 212 in the x direction to be greater than a length corresponding to (360÷M) degrees in electrical angle of the primary coils 112.

Figure 11A:
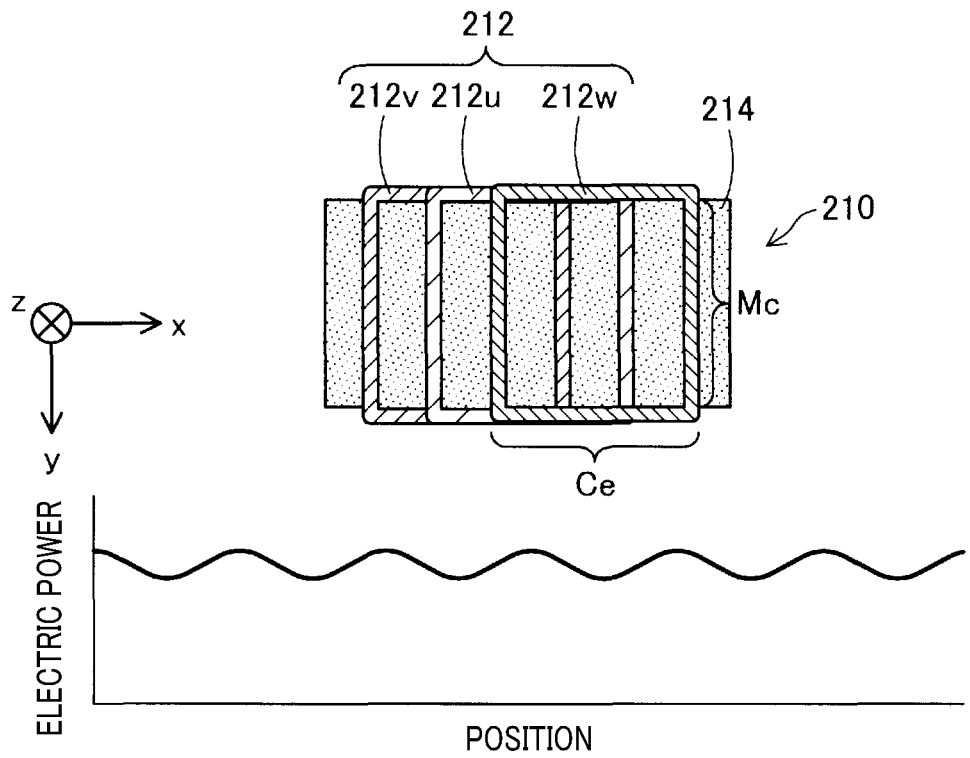
FIG. 11A is an explanatory diagram illustrating a coil configuration where coil ends of a three-phase secondary coil are located outside a magnetic yoke.

As shown in FIG. 11A, a three-phase secondary coil 212 may be arranged so that when viewed along the direction perpendicular to the surface of the magnetic yoke 214 (i.e., along the z direction that is perpendicular to both the x and y directions), coil ends C2 of the secondary coil 212 are located outside the magnetic yoke 214. In this example, the W-phase coil 212w is configured to include a pair of main coil parts Mc and a pair of coil ends Ce. Each of the main coil parts Mc extends in the y direction (i.e., the lateral direction of the vehicle 200), while each of the coil ends Ce extends in the x direction (i.e., the longitudinal direction of the vehicle 200). The U-phase coil 212u and the v-phase coil 212v are also configured similarly to the W-phase coil 212w. By arranging the coil ends Ce of the secondary coil 212 outside the magnetic yoke 214, it is possible to set the magnetic reluctances of magnetic paths through which magnetic flux of the coil ends Ce flows to be higher than the magnetic reluctances of magnetic paths through which magnetic flux of the coil main parts Mc of the secondary coil 212 flows. Here, "magnetic flux of the coil ends Ce" denotes magnetic flux generated by electric current flowing in the coil ends Ce; similarly, "magnetic flux of the coil main parts Mc" denotes magnetic flux generated by electric current flowing in the coil main parts Mc. As explained above based on comparison between the configurations shown in FIGS. 10A and 10C, when the length L214 of the magnetic yoke 214 is short, the mutual inductances between the three phase coils 212v, 212u and 212w of the secondary coil 212 may become imbalanced, causing electric power pulsation to occur. In this regard, by arranging the coil ends Ce of the secondary coil 212 outside the magnetic yoke 214, it is possible to reduce the imbalance of the mutual inductances, thereby reducing the electric power pulsation. In addition, this advantageous effect can also be achieved in the case of the number of phases of a secondary coil 212 being greater than three.

Figure 11B:
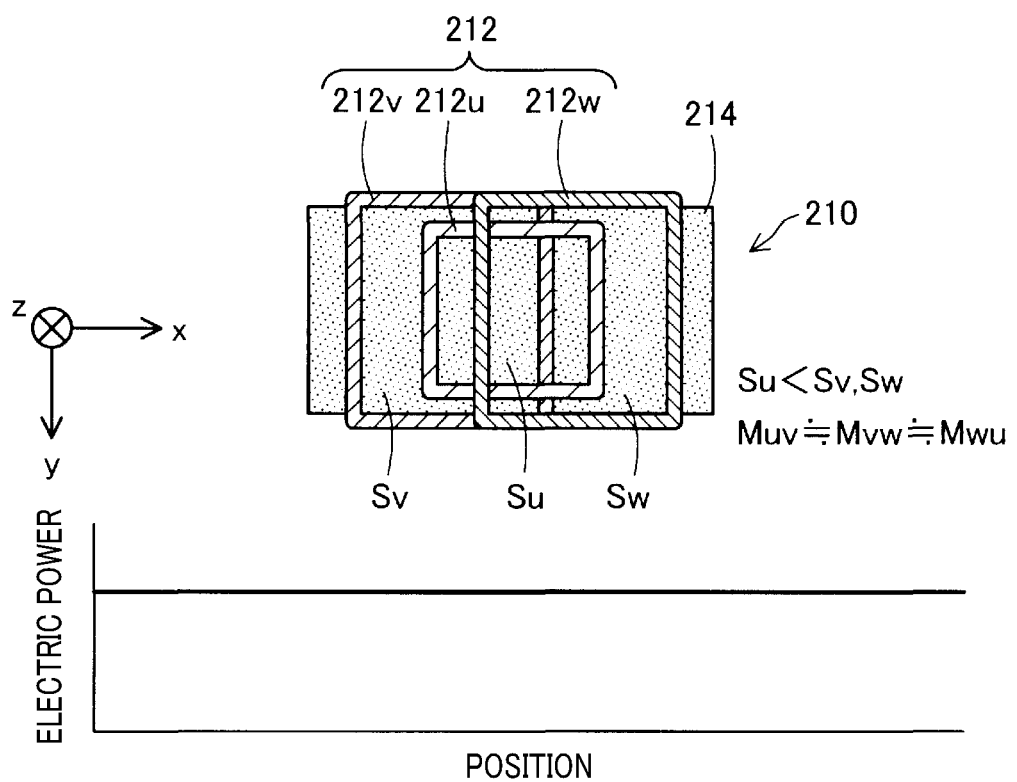
FIG. 11B is an explanatory diagram illustrating a coil configuration where the coil area of a central one of phase coils of a three-phase secondary coil is smaller than the coil areas of the other phase coils.

As shown in FIG. 11B, a three-phase secondary coil 212 may be configured so that when viewed along the direction perpendicular to the surface of the magnetic yoke 214 (i.e., along the z direction that is perpendicular to both the x and y directions), the coil area Su of the U-phase coil 212u, which is centered in the x direction among the three phase coils of the secondary coil 212, is smaller than the coil areas Sv and Sw of the V-phase and w-phase coils 212v and 212w. Here, the term "coil area" denotes the area of a region enclosed by the coil. In the example shown in FIG. 11A, the distance between the V-phase coil 212v and the W-phase coil 212w is longer than both the distance between the U-phase coil 212u and the V-phase coil 212v and the distance between the U-phase coil 212u and the W-phase coil 212w in the x direction (i.e., the longitudinal direction of the vehicle 200). Therefore, the mutual inductance Mvw between the V-phase coil 212v and the W-phase coil 212w is lower than both the mutual inductance Muv between the U-phase coil 212u and the V-phase coil 212v and the mutual inductance Mwu between the W-phase coil 212w and the U-phase coil 212u. Consequently, the imbalance of the mutual inductances may cause electric power pulsation to occur. In this regard, by setting the coil area of a central one (i.e., the U-phase coil 212u in FIG. 11B) of the three phase coils 212v, 212u and 212w of the secondary coil 212 to be smaller than the coil areas of the other phase coils (i.e., the V-phase coil 212v and the W-phase coil 212w in FIG. 11B), it is possible to reduce both the mutual inductances Muv and Mwu, thereby balancing all of the three mutual inductances Muv, Mvw and Mwu to become substantially equal to each other. Consequently, it is possible to reduce the electric power pulsation. In addition, this advantageous effect can also be achieved in the case of the number of phases of a secondary coil 212 being greater than three.

Figure 12A:
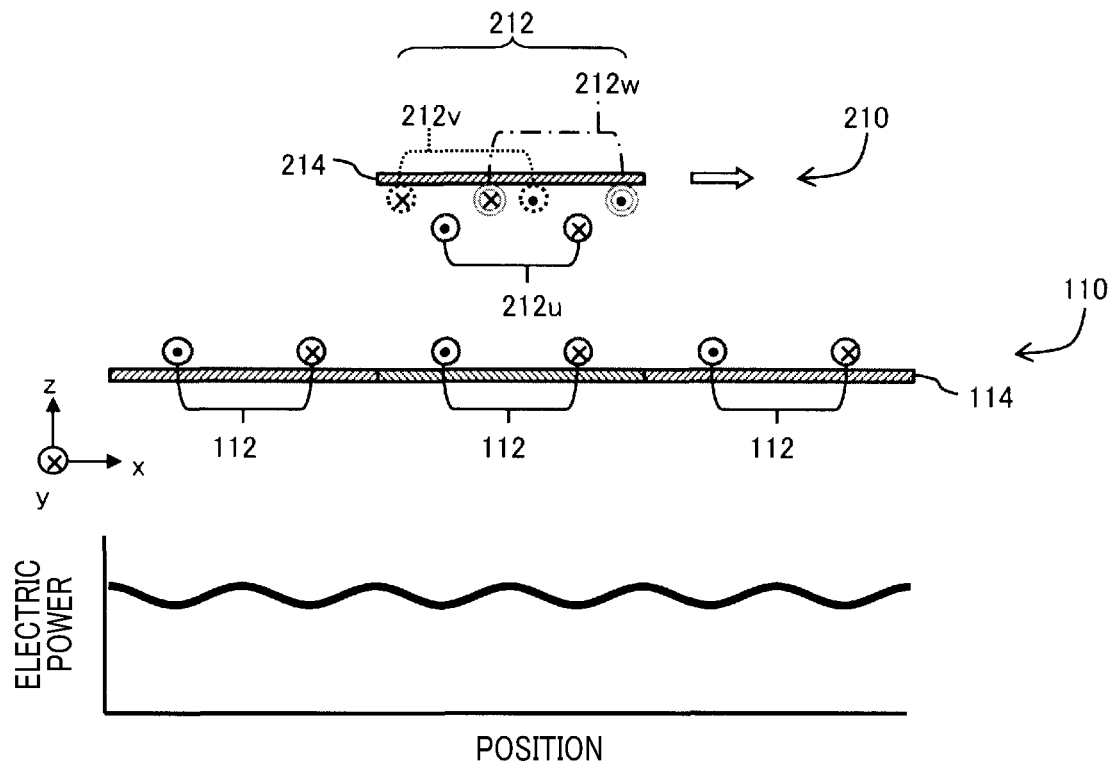
FIG. 12A is an explanatory diagram illustrating a coil configuration where a central one of phase coils of a three-phase secondary coil is located further than the other phase coils from a magnetic yoke.

As shown in FIG. 12A, a three-phase secondary coil 212 may be configured so that the U-phase coil 212u, which is centered in the x direction among the three phase coils of the secondary coil 212, is located further than the V-phase and w-phase coils 212v and 212w from the magnetic yoke 214 in the z direction. In the example shown in FIG. 10A, all of three phase coils 212v, 212u and 212w of the secondary coil 212 are arranged in contact with the surface of the magnetic yoke 214 in the z direction. In this case, the distance between the V-phase coil 212v and the W-phase coil 212w is longer than both the distance between the U-phase coil 212u and the V-phase coil 212v and the distance between the U-phase coil 212u and the W-phase coil 212w in the x direction (i.e., the longitudinal direction of the vehicle 200). Therefore, the mutual inductance Mvw between the V-phase coil 212v and the W-phase coil 212w is lower than both the mutual inductance Muv between the U-phase coil 212u and the V-phase coil 212v and the mutual inductance Mwu between the W-phase coil 212w and the U-phase coil 212u. Consequently, the imbalance of the mutual inductances may cause electric power pulsation to occur. In this regard, by arranging a central one (i.e., the U-phase coil 212u in FIG. 12A) of the three phase coils 212v, 212u and 212w of the secondary coil 212 further than the other phase coils (i.e., the V-phase coil 212v and the W-phase coil 212w in FIG. 12A) from the magnetic yoke 214 in the z direction, it is possible to reduce both the mutual inductances Muv and Mwu, thereby balancing all of the three mutual inductances Muv, Mvw and Mwu to become substantially equal to each other. Consequently, it is possible to reduce the electric power pulsation.

Figure 12B:
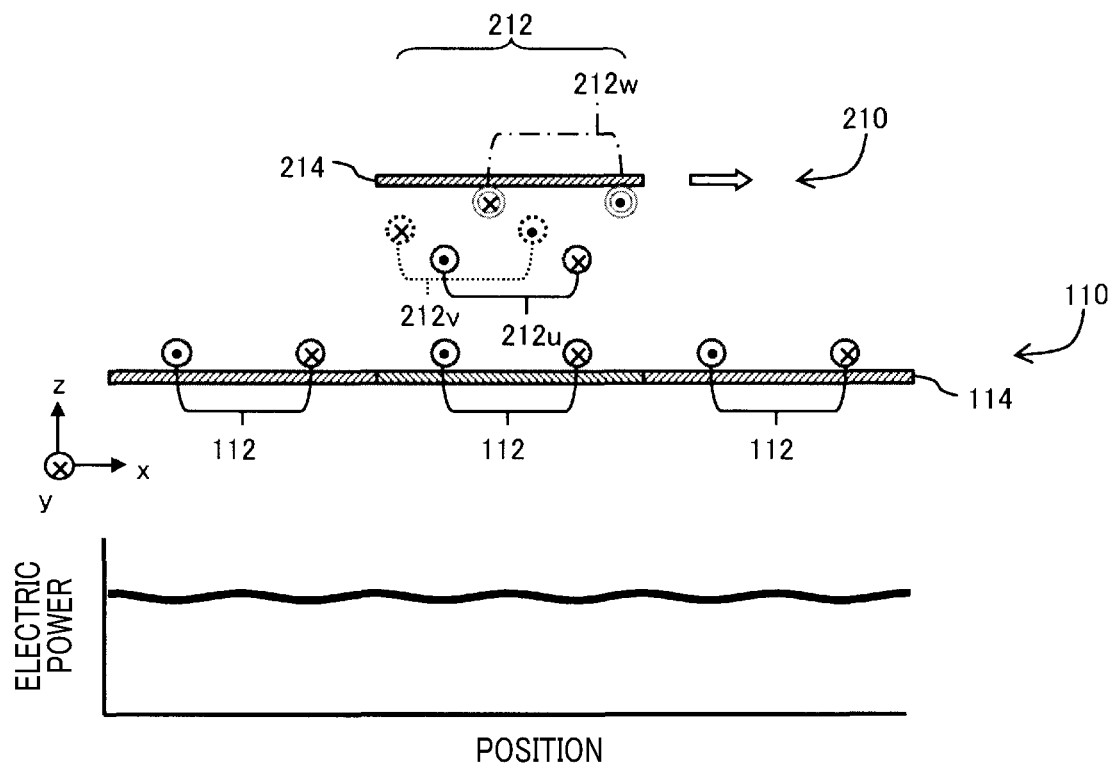
FIG. 12B is an explanatory diagram illustrating a coil configuration where distances from a magnetic yoke to phase coils of a three-phase secondary coil increase sequentially.

As shown in FIG. 12B, not only the U-phase coil 212u that is centered in the x direction among the three phase coils of the secondary coil 212, but also one of the other phase coils (e.g., the V-phase coil 212v) may also be arranged apart from the magnetic yoke 214 in the z direction. Moreover, in this case, it is preferable for the three phase coils of the secondary coil 212 to be arranged such that the closer they are to the center in the order of arrangement of the phase coils along the x direction, the further they are from the magnetic yoke 214 in the z direction. With the above arrangement, it is possible to more suitably balance all of the three mutual inductances Muv, Mvw and Mwu, thereby more effectively reducing the electric power pulsation.

In addition, the above configurations shown in FIGS. 12A and 12B can also be applied to cases where the number of phases of a secondary coil 212 is greater than three. Specifically, in the case of the number M of phases of a secondary coil 212 being greater than or equal to three, it is preferable to arrange one of the M phase coils of the secondary coil 212, which is centered in the x direction among the M phase coils, further than the other phase coils from the magnetic yoke 214 in the z direction. Moreover, it is more preferable to arrange the M phase coils of the secondary coil 212 such that the closer they are to the center in the order of arrangement of the phase coils along the x direction, the further they are from the magnetic yoke 214 in the z direction. Furthermore, in these arrangements, by configuring the secondary coil 212 to have the coil ends Ce thereof located outside the magnetic yoke 214 as illustrated in FIG. 11A, it is possible to more effectively reduce the electric power pulsation.

Figure 13A:
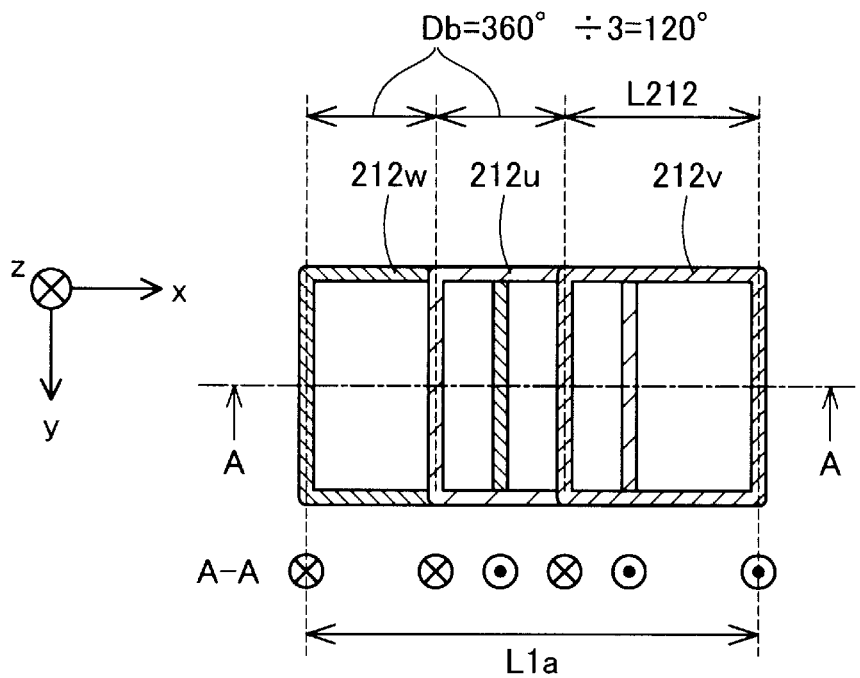
FIG. 13A is an explanatory diagram illustrating a coil configuration where phase coils of a three-phase secondary coil are wound in the same manner.

As shown in FIG. 13A, a three-phase secondary coil 212 may be configured to have all of three phase coils 212w, 212u and 212v of the secondary coil 212 wound in the same manner (i.e. in the same direction). In a lower part of FIG. 13A, there are indicated directions of electric currents flowing in coil wires of the phase coils 212w, 212u and 212v. In this case, to make the difference in phase between each adjacent pair of the phase coils 212w, 212u and 212v equal to 120 degrees, the offset width Db between the phase coils 212w, 212u and 212v may be set to a value corresponding to 120 degrees in electrical angle of the primary coils 112.

Figure 13B:
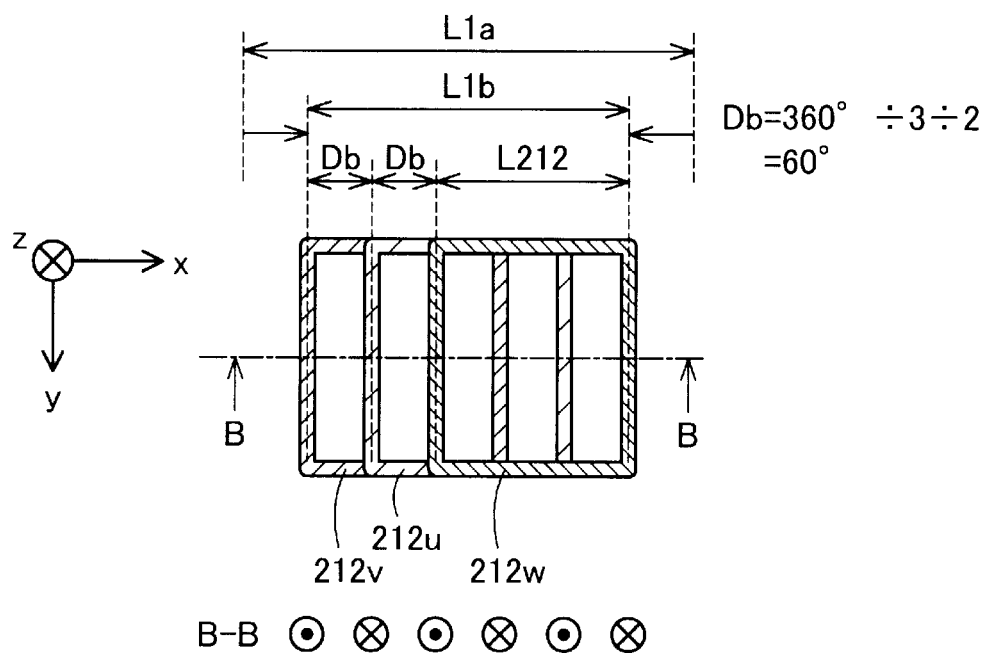
FIG. 13B is an explanatory diagram illustrating a coil configuration where phase coils of a three-phase secondary coil are wound alternately in opposite directions.

As shown in FIG. 13B, a three-phase secondary coil 212 may alternatively be configured to have one of three phase coils of the secondary coil 212 (i.e., the U-phase coil 212u in FIG. 13B) wound in an opposite manner (i.e., in an opposite direction) to the other phase coils (i.e., the V-phase coil 212v and the W-phase coil 212w in FIG. 13B). In this case, to make the difference in phase between each adjacent pair of the phase coils 212v, 212u and 212w equal to 120 degrees, the offset width Db between the phase coils 212v, 212u and 212w may be set to a value corresponding to 60 degrees in electrical angle of the primary coils 112. Specifically, in this case, the offset width Db between the adjacent pair of the V-phase coil 212v and the U-phase coil 212u corresponds to 60 degrees in electrical angle and the U-phase coil 212u wound in an opposite manner to the V-phase coil 212v; therefore, the phase of electric current of the U-phase coil 212u is equal to −180 degrees and the difference in phase between the V-phase coil 212v and the U-phase coil 212u is equal to 120 (i.e., |60−180|) degrees. In addition, though the length L212 of each phase coil in the x direction (i.e., the longitudinal direction of the vehicle 200) may be arbitrarily set, in the case of keeping the length L212 of each phase coil equal to that in the configuration shown in FIG. 13A, the length L1b of the entire secondary coil 212 in the x direction in FIG. 13B becomes smaller than the length L1a of the entire secondary coil 212 in the x direction in FIG. 13A. As above, by setting the winding directions of the phase coils of the three-phase secondary coil 212 to be alternately opposite in the order of arrangement of the phase coils along the x direction, it is possible to reduce the size of the entire secondary coil 212.

Figure 14A:
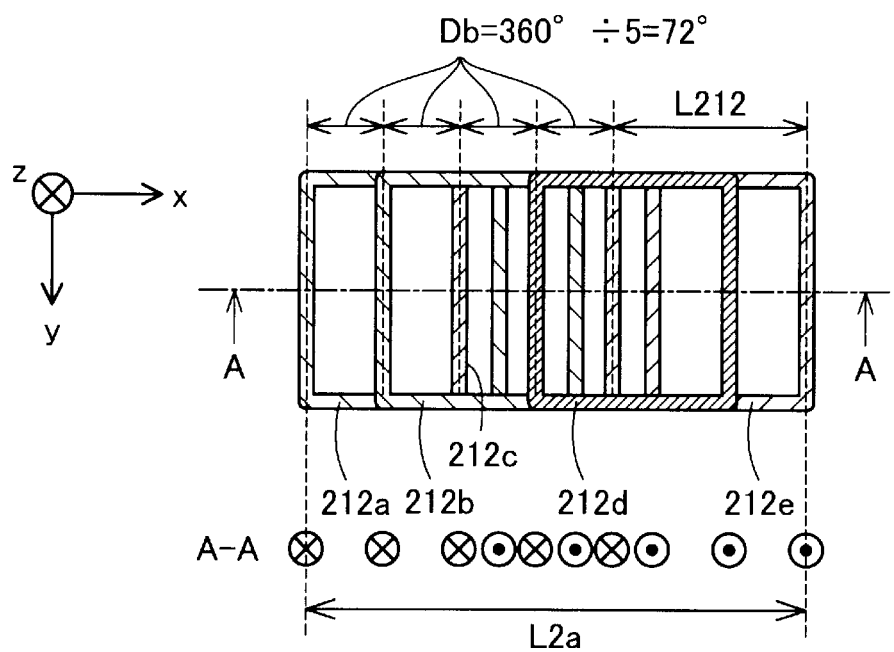
FIG. 14A is an explanatory diagram illustrating a coil configuration where phase coils of a five-phase secondary coil are wound in the same manner.

As shown in FIG. 14A, a five-phase secondary coil 212 may be configured to have all of five phase coils 212a-212e of the secondary coil 212 wound in the same manner (i.e., in the same direction). In a lower part of FIG. 14A, there are indicated directions of electric currents flowing in coil wires of the phase coils 212a-212e. In this case, to make the difference in phase between each adjacent pair of the phase coils 212a-212e equal to 72 degrees, the offset width Db between the phase coils 212a-212e may be set to a value corresponding to 72 degrees in electrical angle of the primary coils 112.

Figure 14B:
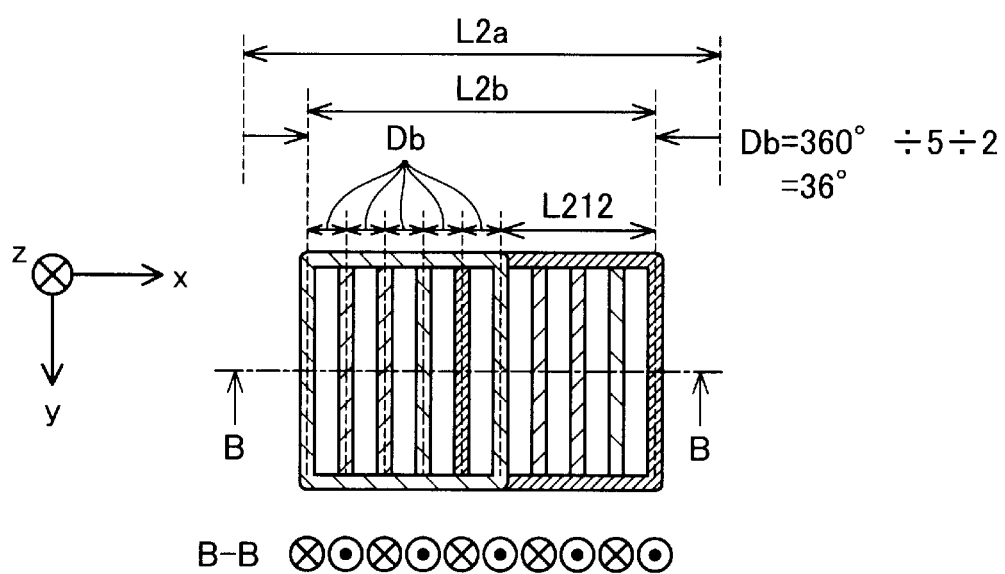
FIG. 14B is an explanatory diagram illustrating a coil configuration where phase coils of a five-phase secondary coil are wound alternately in opposite directions.

As shown in FIG. 14B, a five-phase secondary coil 212 may alternatively be configured to have five phase coils of the secondary coil 212 wound alternately in opposite directions in the order of arrangement of the phase coils along the x direction (i.e., the longitudinal direction of the vehicle 200). In this case, to make the difference in phase between each adjacent pair of the five phase coils equal to 72 degrees, the offset width Db between the phase coils may be set to a value corresponding to 36 degrees in electrical angle of the primary coils 112. In addition, in the case of keeping the length L212 of each phase coil in the x direction equal to that in the configuration shown in FIG. 14A, the length L2b of the entire secondary coil 212 in the x direction in FIG. 14B becomes smaller than the length L2a of the entire secondary coil 212 in the x direction in FIG. 14A. As above, by setting the winding directions of the phase coils of the five-phase secondary coil 212 to be alternately opposite in the order of arrangement of the phase coils along the x direction, it is possible to reduce the size of the entire secondary coil 212.

The preferable manners of winding coils illustrated in FIGS. 13B and 14B can be applied to cases where the number M of phases of a secondary coil 212 is greater than or equal to three. In general, when the number M of phases of a secondary coil 212 is greater than or equal to three, it is preferable to set the winding direction of at least one of M phase coils of the secondary coil 212 to be opposite to the winding directions of the other phase coils. It is particularly preferable to set the winding directions of all the M phase coils of the secondary coil 212 to be alternately opposite in the order of arrangement of the phase coils along the x direction (i.e., the longitudinal direction of the vehicle 200). Moreover, it is also preferable to set the offset width Db between the M phase coils of the secondary coil 212 in the x direction to be greater than or equal to a length corresponding to (360÷M÷2) degrees in electrical angle of the primary coils 112. On the other hand, if the offset width Db was set to be excessively greater than a length corresponding to (360÷M) degrees in electrical angle of the primary coils 112, the size of the secondary coil 212 would become large. In consideration of the above, it is particularly preferable to set the offset width Db between the M phase coils of the secondary coil 212 in the x direction to be greater than or equal to the length corresponding to (360÷M÷2) degrees in electrical angle of the primary coils 112 and less than or equal to a length corresponding to (360÷M÷2+20) degrees in electrical angle of the primary coils 112. Setting the offset width Db as above, it is possible to reduce the size of the entire secondary coil 212.

Figure 15A:
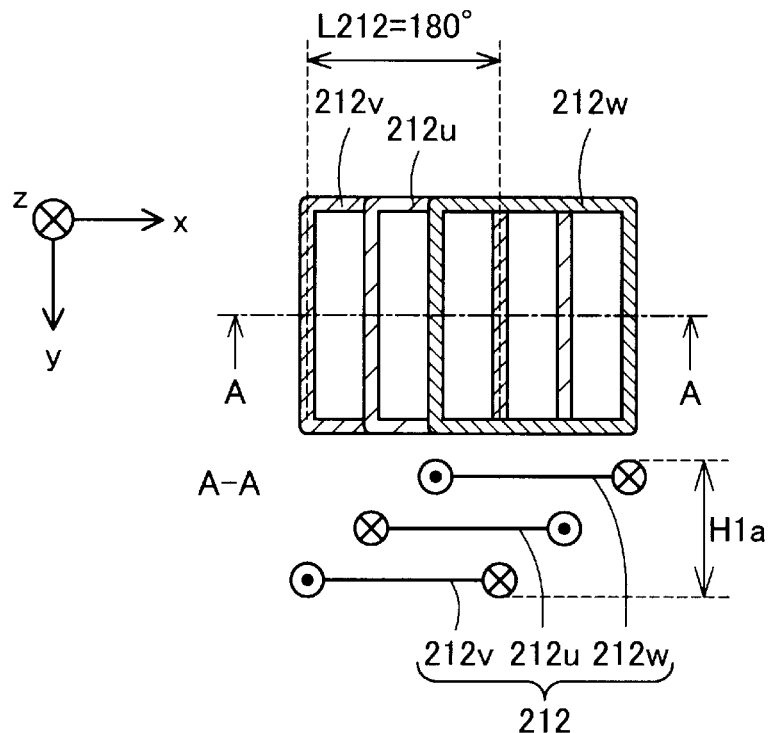
FIG. 15A is an explanatory diagram illustrating an arrangement of phase coils of a three-phase secondary coil in a z direction.

In an upper part of FIG. 15A, there is illustrated an arrangement of the three phase coils 212v, 212u and 212w of the three-phase secondary coil 212 shown in FIG. 13B on a plane perpendicular to z direction (i.e., the vertical direction); in a lower part of FIG. 15A, there is illustrated an arrangement of the three phase coils 212v, 212u and 212w in the z direction. In addition, the z direction is perpendicular to the surface of the magnetic yoke 214 that is omitted from FIG. 15A for the sake of simplicity. In the example shown in FIG. 15A, the length L212 of each phase coil of the secondary coil 212 in the x direction (i.e., the longitudinal direction of the vehicle 200) is set to 180 degrees in electrical angle of the primary coils 112; and the three phase coils 212v, 212u and 212w are sequentially stacked in the z direction. Consequently, the height of the entire secondary coil 212 in the z direction has a relatively large value H1a.

Figure 15B:
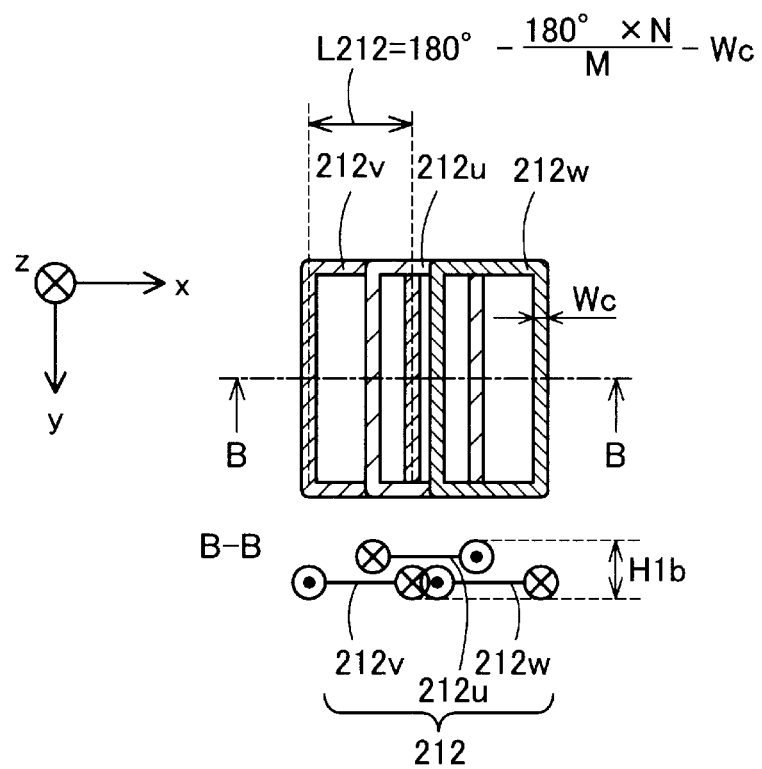
FIG. 15B is an explanatory diagram illustrating both a coil configuration where phase coils of a three-phase secondary coil are shortened in an X direction and an arrangement of the phase coils of the three-phase secondary coil in a z direction.

In contrast, as shown in FIG. 15B, by setting the length L212 of each phase coil of the secondary coil 212 in the x direction to be smaller than that in the example shown in FIG. 15A, it is possible to reduce the height of the entire secondary coil 212 in the z direction to a relatively small value H1b. Specifically, in the example shown in FIG. 15B, it is preferable to set the length L212 of each phase coil of the secondary coil 212 in the x direction to satisfy the following mathematical expression (2):

$$L212 \leq 180 - 180 \div M \times N - Wc \qquad (2)$$

where M is the number of phases of the secondary coil 212, N is an integer greater than or equal to 1 and less than or equal to (M−2), and Wc is the width of coil wires of the phase coils. In addition, the right side of the above mathematical expression (2) is expressed in electrical angle of the primary coils 112.

Considering the fact that the right side of the above mathematical expression (2) becomes largest when N=1, the mathematical expression (2) can be rewritten into the following mathematical expression (3):

$$L212 \leq 180 - 180 \div M - Wc \qquad (3)$$

In addition, in the case of the number M of phases of the secondary coil 212 being equal to three, N can take only one value, i.e., 1. Therefore, in this case, the above mathematical expressions (2) and (3) are equivalent to each other.

Setting the length L212 of each phase coil of the secondary coil 212 in the x direction to satisfy the above mathematical expression (2) or (3), it is possible to arrange two of the phase coils (i.e., the V-phase coil 212v and the W-phase coil 212w in FIG. 15B) at equal distances from the magnetic yoke 214 in the z direction without making them cross each other; meanwhile, it is possible to stack the remaining phase coil (i.e., the U-phase coil 212u in FIG. 15B) on the two phase coils. Consequently, it becomes possible to preferably reduce the height of the entire secondary coil 212 in the z direction from the value H1a shown in FIG. 15A to the smaller value H1b shown in FIG. 15B.

The above mathematical expression (2) or (3) can be applied to cases where the number M of phases of a secondary coil 212 is greater than or equal to three. In these cases, upon satisfying the above mathematical expression (2) or (3), it is preferable to arrange at least two of the M phase coils of the secondary coil 212 at equal distances from the magnetic yoke 214 in the z direction and in alignment with each other in the x direction.

Figure 16A:
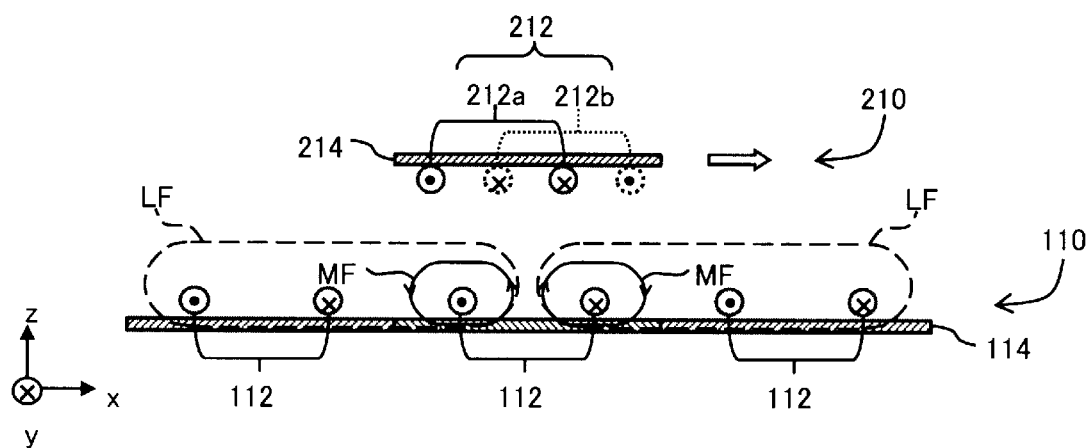
FIG. 16A is an explanatory diagram illustrating electric power pulsation when magnetic yokes provided respectively for primary coils are arranged without any gap formed therebetween.
Figure 16B:
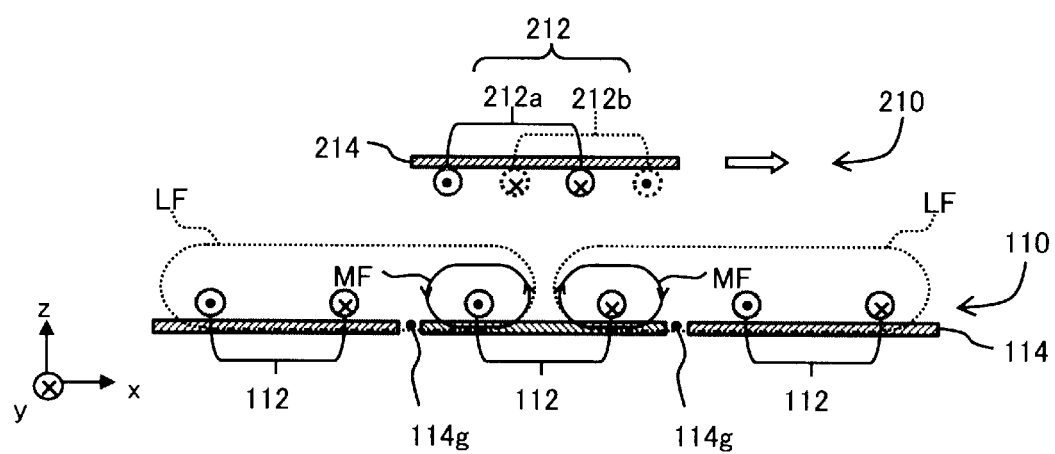
FIG. 16B is an explanatory diagram illustrating electric power pulsation when magnetic yokes provided respectively for primary coils are spaced from one another with gaps formed therebetween.

As comparatively shown in FIGS. 16A and 16B, in terms of reducing the electric power pulsation during traveling of the vehicle 200, it is preferable to provide gaps 114g between the magnetic yokes 114 of the power-transmitting coil units 110.

Specifically, the coil configuration shown in FIG. 16A is identical to the single-phase/two-phase coil configuration shown in FIG. 2D where each of the primary coils 112 is a single-phase coil and the secondary coil 212 is a two-phase coil. The magnetic yokes 114 provided respectively for the primary coils 112 are arranged without any gap formed therebetween in the x direction (i.e., the longitudinal direction of the vehicle 200). In FIG. 16A, there are also depicted both main magnetic flux MF and leakage magnetic flux LF that are generated upon energizing only one of the three primary coils 112 which is centered in the x direction (i.e., without energizing the two primary coils 112 located respectively at opposite ends in the x direction). Arranging the magnetic yokes 114 without any gap formed therebetween in the x direction, magnetic flux generated by the energized primary coil 112 will flow also to the magnetic yokes 114 provided for the deenergized primary coils 112, increasing the leakage magnetic flux LF. Consequently, problems may be caused which include, for example, electromagnetic disturbance, human exposure to the leakage magnetic flux LF and metal overheating. In addition, the leakage magnetic flux LF may be reduced by increasing the magnetic reluctances of the magnetic yokes 114; however, in this case, the efficiency might be lowered and/or the electric power pulsation might be increased due to distortion of the magnetic flux density distribution.

In contrast, in FIG. 16B, the magnetic yokes 114 are spaced from one another in the x direction with gaps 114g formed therebetween at positions where no coil wires of the primary coils 112 exist. Specifically, each of the gaps 114g is formed at a position corresponding to a boundary between each adjacent pair of the primary coils 112 in the x direction. Forming gaps 114g at the positions where no coil wires of the primary coils 112 exist, the gaps 114g will function as magnetic gaps to reduce the leakage magnetic flux LF. Moreover, the main magnetic flux MF does not pass through the gaps 114g; therefore, the main magnetic flux MF will not be reduced by the gaps 114g and thus the electric power supply performance will not be lowered by the gaps 114g. Consequently, it becomes possible to avoid the above problems which may occur with the arrangement of the magnetic yokes 114 shown in FIG. 16A. As a result, it becomes possible to improve the efficiency and reduce the electric power pulsation. In addition, provided that the gaps 114g can function as magnetic gaps, they can be either kept as void spaces or filled with a nonmagnetic material such as a resin or a nonmagnetic metal.

Figure 17A:
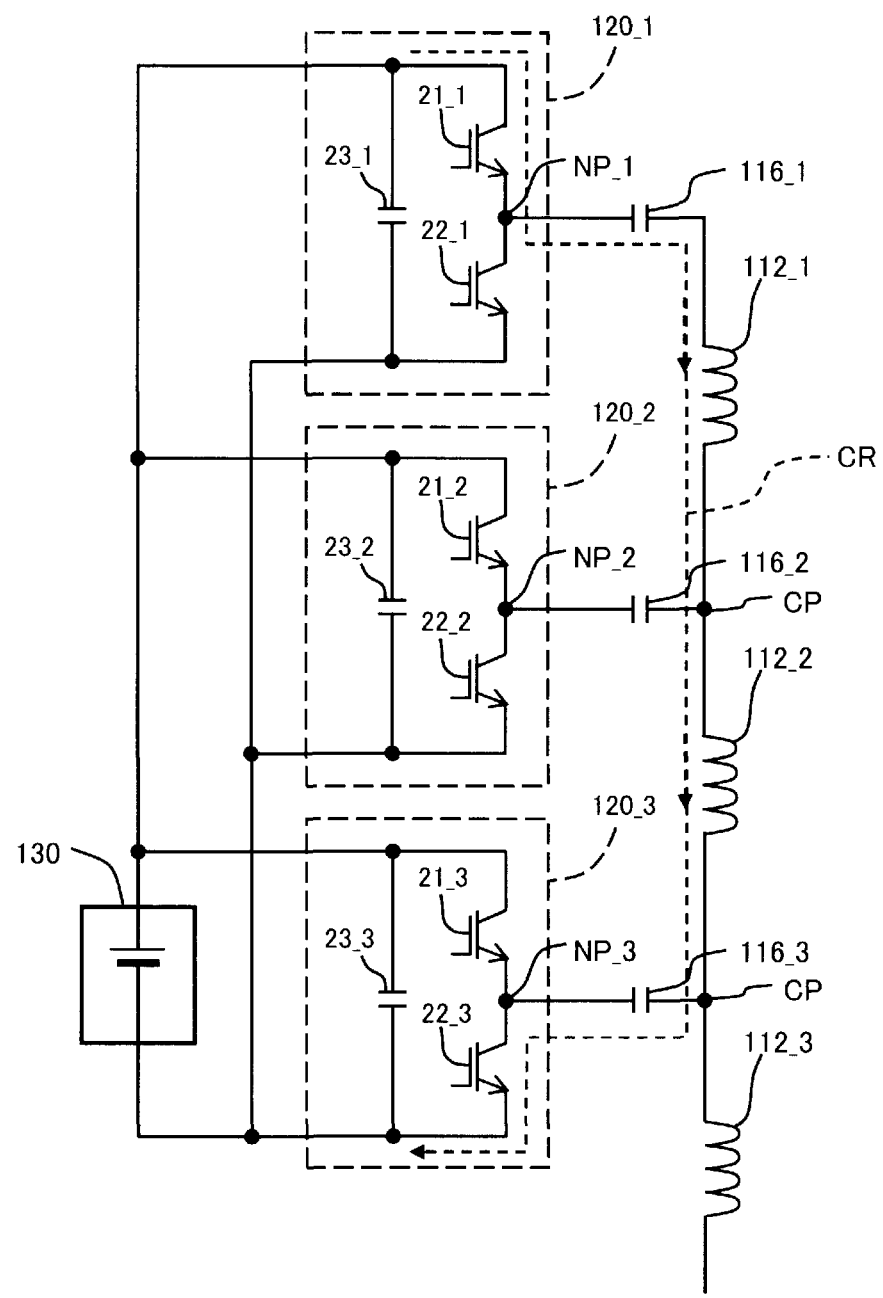
FIG. 17A is an explanatory diagram illustrating an example of a circuit configuration of power-transmitting circuits and electric current paths.

As shown in FIG. 17A, it is preferable for each of the power-transmitting circuits 120 to be configured as a half-bridge circuit that includes two switches. Specifically, in FIG. 17A, there is shown an exemplary circuit configuration that includes three adjacent power-transmitting circuits 120_1, 120_2 and 120_3, three primary coils 112_1, 112_2 and 112_3, and three resonant capacitors 116_1, 116_2 and 116_3. It should be noted that numbers [_1], [_2] and [_3] suffixed to reference numerals designating the circuit elements are used only for the purpose of distinguishing the three circuits from each other. Moreover, in the following explanation, reference numerals without numbers [_1], [_2] and [_3] suffixed thereto will be used in situations where it is unnecessary to distinguish the three circuits.

In the circuit configuration shown in FIG. 17A, each of the power-transmitting circuits 120 is connected with the power supply circuit 130 to receive the DC voltage from the power supply circuit 130. Each of the power-transmitting circuits 120 includes a high-potential-side switch 21, a low-potential-side switch 22, and a capacitor 23 connected in parallel to the high-potential-side and low-potential-side switches 21 and 22 that are connected in series with each other. It should be noted that the capacitor 23 may be omitted from the circuit. Moreover, it also should be noted that for the sake of simplicity, a switching signal generation circuit, which is configured to generate switching signals and output the generated switching signals to the switches 21 and 22, is not shown in FIG. 17A (also not shown in FIG. 17B to be described later).

Moreover, in the circuit configuration shown in FIG. 17A, the primary coils 112 are connected in series with each other. A junction point NP_1 between the high-potential-side and low-potential-side switches 21_1 and 22_2 of the power-transmitting circuit 120_1 is connected, via the resonant capacitor 116_1, to one end of the primary coil 112_1. Moreover, a junction point NP_2 between the high-potential-side and low-potential-side switches 21_2 and 22_2 of the power-transmitting circuit 120_2 is connected, via the resonant capacitor 116_2, to a junction point CP between the adjacent pair of the primary coils 112_1 and 112_2. Similarly, a junction point NP_3 between the high-potential-side and low-potential-side switches 21_3 and 22_3 of the power-transmitting circuit 120_3 is connected, via the resonant capacitor 116_3, to a junction point CP between the adjacent pair of the primary coils 112_2 and 112_3.

In FIG. 17A, an exemplary electric current path CR is shown with dashed lines and arrows. The electric current path CR is formed when both the high-potential-side switch 21_1 of the power-transmitting circuit 120_1 and the low-potential-side switch 22_3 of the power-transmitting circuit 120_3 are placed in an ON state and the other switches are placed in an OFF state. Consequently, through the electric current path CR, electric current flows in a direction indicated by the arrows in FIG. 17A, energizing the pair of the primary coils 112_1 and 112_2. Moreover, though not shown in FIG. 17A, an opposite electric current path to the electric current path CR is formed when both the low-potential-side switch 22_1 of the power-transmitting circuit 120_1 and the high-potential-side switch 21_3 of the power-transmitting circuit 120_3 are placed in an ON state and the other switches are placed in an OFF state. Consequently, through the opposite electric current path, electric current flows in a direction opposite to the direction indicated by the arrows in FIG. 17A, energizing the pair of the primary coils 112_1 and 112_2.

Figure 17B:
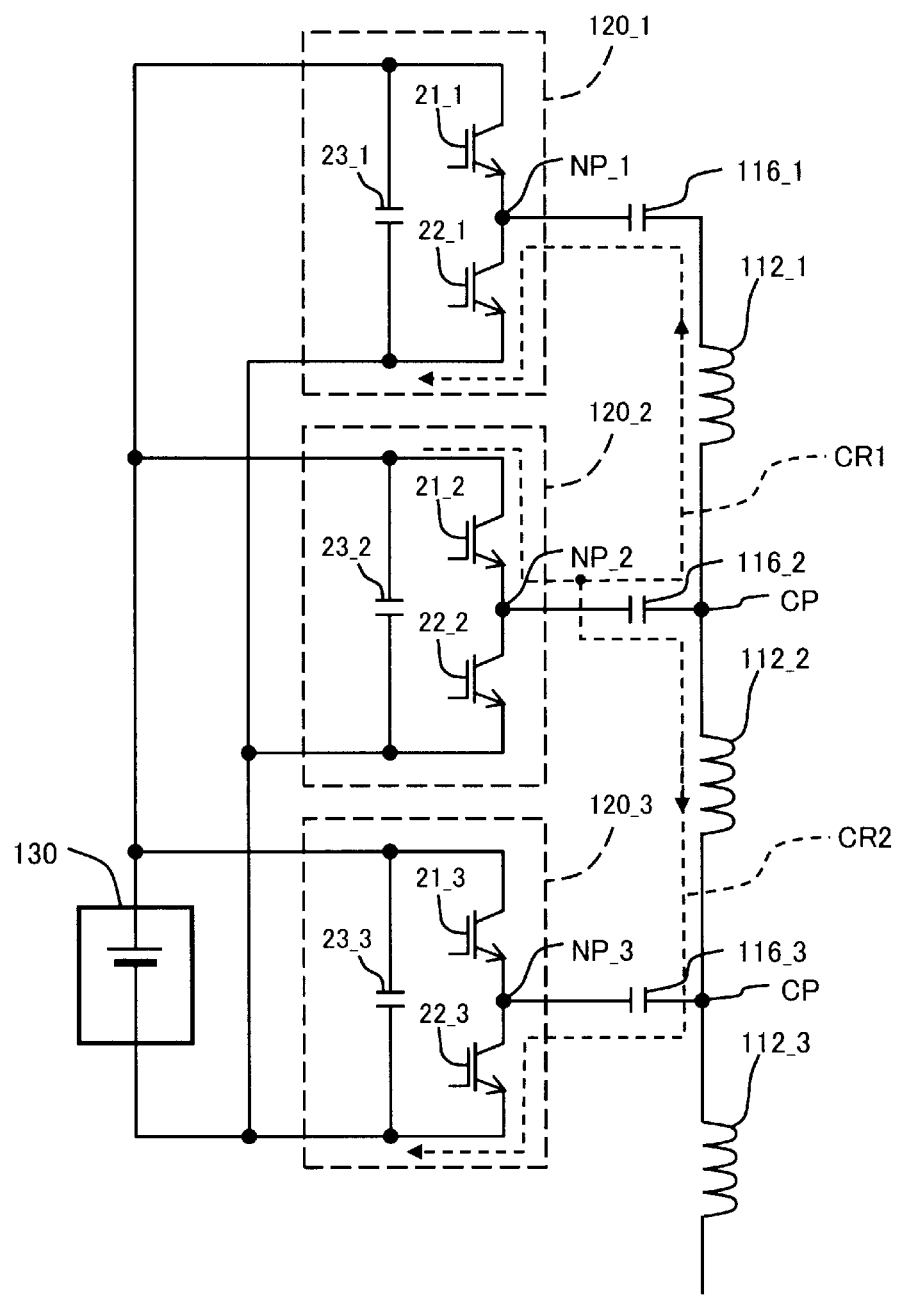
FIG. 17B is an explanatory diagram illustrating other electric current paths that can be realized with the same power-transmitting circuits as shown in FIG. 17A.

FIG. 17B shows electric current paths CR1 and CR2 that can be formed with the same circuit configuration as shown in FIG. 17A, but are different from the electric current path CR shown in FIG. 17A. Specifically, the electric current path CR1 can be formed by placing both the low-potential-side switch 22_1 of the power-transmitting circuit 120_1 and the high-potential-side switch 21_2 of the power-transmitting circuit 120_2 in an ON state. Meanwhile, the electric current path CR2 can be formed by placing both the high-potential-side switch 21_2 of the power-transmitting circuit 120_2 and the low-potential-side switch 22_3 of the power-transmitting circuit 120_3 in an ON state. Consequently, through the electric current paths CR1 and CR2, electric currents flow as indicated by arrows in FIG. 17B, respectively energizing the primary coils 112_1 and 112_2.

In addition, the electrical connection between the primary coils 112 and the resonant capacitors 116 in the electric current path CR shown in FIG. 17A is different from the electrical connection between the primary coils 112 and the resonant capacitors 116 in the electric current paths CR1 and CR2 shown in FIG. 17B. Accordingly, the resonance condition in the electric current path CR shown in FIG. 17A is different from the resonance condition in the electric current paths CR1 and CR2 shown in FIG. 17B. Therefore, the capacitances of the resonant capacitors 116 are preset to suitable values depending on whether to use the electric current path CR shown in FIG. 17A or the electric current paths CR1 and CR2 shown in FIG. 17B.

With the circuit configuration shown in FIGS. 17A and 17B, it is possible to transmit electric power with the power-transmitting circuits 120 each of which is configured as a simple half-bridge circuit. Consequently, it is possible to reduce the number of switch elements employed in each of the power-transmitting circuits 120 in comparison with the case of configuring each of the power-transmitting circuits 120 as a full-bridge circuit.

The present disclosure is not limited to the above-described embodiments and modifications and can be carried out in various modes without departing from the spirit of the present disclosure. Moreover, the above-described various characteristic configurations can be employed in arbitrary combination with each other unless they are contradictory to each other.

What is claimed is:

1. A contactless power supply system for supplying electric power to a vehicle in a contactless manner during traveling of the vehicle, the contactless power supply system comprising:
   a plurality of primary coils installed along a traveling direction in a road; and
   a secondary coil mounted to the vehicle,
   wherein
   each of the primary coils is a single-phase coil and the secondary coil is a two-phase coil that consists of a first-phase coil and a second-phase coil, and
   the amplitude of a second-order component of the square of a coupling coefficient between each primary coil and the secondary coil is in a range of 0 to 0.001.

2. A contactless power supply apparatus for use in the contactless power supply system as set forth in claim 1, the contactless power supply apparatus comprising:
   the plurality of primary coils;
   a power supply circuit configured to supply a DC voltage; and
   a plurality of power-transmitting circuits each of which is configured to convert the DC voltage supplied from the power supply circuit into an AC voltage and apply the AC voltage to a corresponding one of the primary coils.

3. A contactless power supply system for supplying electric power to a vehicle in a contactless manner during traveling of the vehicle, the contactless power supply system comprising:
   a plurality of primary coils installed along a traveling direction in a road; and
   a secondary coil mounted to the vehicle,
   wherein
   each of the primary coils is a single-phase coil, and
   the secondary coil is an M-phase coil that consists of M phase coils, where M is an integer greater than or equal to three.

4. The contactless power supply system as set forth in claim 3, wherein an offset width between the M phase coils of the secondary coil in a longitudinal direction of the vehicle is set to be greater than a length corresponding to (360÷M) degrees in electrical angle of the primary coils.

5. The contactless power supply system as set forth in claim 3, wherein the M phase coils of the secondary coil are arranged along a longitudinal direction of the vehicle, and
   a coil area of one of the M phase coils, which is centered in the longitudinal direction of the vehicle among the M phase coils, is set to be smaller than coil areas of the other phase coils.

6. The contactless power supply system as set forth in claim 3, wherein for the secondary coil, there is provided a magnetic yoke,
   the M phase coils of the secondary coil are arranged along a longitudinal direction of the vehicle, and
   one of the M phase coils, which is centered in the longitudinal direction of the vehicle among the M phase coils, is located further than the other phase coils from the magnetic yoke.

7. The contactless power supply system as set forth in claim 6, wherein each of the M phase coils of the secondary coil has main coil parts extending in a lateral direction of the vehicle and coil ends extending in the longitudinal direction of the vehicle, and
   the M phase coils of the secondary coil are arranged so that when viewed along a direction perpendicular to both the longitudinal and lateral directions of the vehicle, the coil ends of the M phase coils are located outside the magnetic yoke.

8. The contactless power supply system as set forth in claim 3, wherein a winding direction of one of the M phase coils of the secondary coil is different from a winding direction of another of the M phase coils.

9. The contactless power supply system as set forth in claim 8, wherein the winding directions of the M phase coils of the secondary coil are alternately opposite in an order of arrangement of the M phase coils along the longitudinal direction of the vehicle.

10. The contactless power supply system as set forth in claim 8, wherein an offset width between the M phase coils of the secondary coil in a longitudinal direction of the vehicle is set to a value in a range greater than or equal to (360÷M÷2) degrees and less than or equal to (360÷M÷2+20) degrees in electrical angle of the primary coils.

11. The contactless power supply system as set forth in claim 3, wherein each of the M phase coils of the secondary coil has a length in a longitudinal direction of the vehicle, the length being set to be smaller than or equal to a value corresponding to (180−180÷M−Wc) degrees in electrical angle of the primary coils, where Wc is a width of coil wires of the M phase coils.

12. A contactless power supply apparatus for use in the contactless power supply system as set forth in claim 3, the contactless power supply apparatus comprising:
   the plurality of primary coils;
   a power supply circuit configured to supply a DC voltage; and
   a plurality of power-transmitting circuits each of which is configured to convert the DC voltage supplied from the power supply circuit into an AC voltage and apply the AC voltage to a corresponding one of the primary coils.

13. A contactless power supply system for supplying electric power to a vehicle in a contactless manner during traveling of the vehicle, the contactless power supply system comprising:
a plurality of primary coils installed along a traveling direction in a road;
a secondary coil mounted to the vehicle;
a power supply circuit configured to supply a DC voltage; and
a plurality of power-transmitting circuits each of which is configured to convert the DC voltage supplied from the power supply circuit into an AC voltage and apply the AC voltage to a corresponding one of the primary coils, each of the power-transmitting circuits having both a high-potential-side switch and a low-potential-side switch connected with the power supply circuit,
wherein
each of the primary coils is a single-phase coil with the secondary coil being a multi-phase coil, or each of the primary coils is a multi-phase coil with the secondary coil being a single-phase coil,
the primary coils are connected in series with each other, and
a junction point between each adjacent pair of the primary coils is connected, via a resonant capacitor, to a junction point between the high-potential-side and low-potential-side switches of one of the power-transmitting circuits.

14. A contactless power supply apparatus for use in the contactless power supply system as set forth in claim 13, the contactless power supply apparatus comprising:
the plurality of primary coils;
the power supply circuit; and
the plurality of power-transmitting circuits.

* * * * *